US008363279B2

United States Patent
Kikuchi et al.

(10) Patent No.: US 8,363,279 B2
(45) Date of Patent: Jan. 29, 2013

(54) METHOD AND DEVICE FOR SETTING MULTIPLE TONES IN HALFTONE PROCESS TO PREVENT MIXING OF ADJACENT INK DOTS

(75) Inventors: Naoki Kikuchi, Kanagawa (JP); Takashi Kimura, Kanagawa (JP); Takahiro Ike, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1315 days.

(21) Appl. No.: 11/724,355

(22) Filed: Mar. 14, 2007

(65) Prior Publication Data

US 2007/0216953 A1 Sep. 20, 2007

(30) Foreign Application Priority Data

Mar. 15, 2006 (JP) .................................. 2006-070099
Feb. 15, 2007 (JP) .................................. 2007-035524

(51) Int. Cl.
*G06K 15/00* (2006.01)
*G06K 9/00* (2006.01)
*G03G 13/04* (2006.01)

(52) U.S. Cl. ........ 358/3.06; 358/1.9; 358/3.05; 358/3.1; 358/3.14; 358/3.16; 358/534; 358/536; 382/252; 382/270; 347/5; 347/100; 347/131

(58) Field of Classification Search ................ 358/3.06, 358/1.9, 2.1, 3.03–3.05, 3.08, 3.1, 3.13, 3.14, 358/3.16, 534–536, 3.3; 382/162, 167, 252, 382/270; 345/596, 616, 63, 72, 89, 98, 132, 345/138, 141, 127–130, 467, 441, 472; 347/5, 347/6, 54, 74–78, 80, 100, 131, 213, 254
See application file for complete search history.

(56) References Cited

U.S. PATENT DOCUMENTS

| | | | |
|---|---|---|---|
| 4,795,284 A | 1/1989 | Yumoto et al. |
| 4,972,270 A | 11/1990 | Kurtin et al. |
| 4,990,939 A | 2/1991 | Sekiya et al. |
| 5,172,139 A | 12/1992 | Sekiya et al. |
| 5,237,344 A | 8/1993 | Tasaki et al. |
| 5,258,850 A | 11/1993 | Tai |
| 5,293,182 A | 3/1994 | Sekiya et al. |
| 5,389,962 A | 2/1995 | Sekiya et al. |
| 5,400,065 A | 3/1995 | Tomono et al. |
| 5,412,413 A | 5/1995 | Sekiya et al. |
| 5,600,356 A | 2/1997 | Sekiya et al. |
| 5,821,968 A | 10/1998 | Ohyama et al. |

(Continued)

FOREIGN PATENT DOCUMENTS

| | | |
|---|---|---|
| EP | 1078771 A2 | 2/2001 |
| JP | 64-11836 | 1/1989 |

(Continued)

OTHER PUBLICATIONS

Jul. 5. 2007 European search report in connection with corresponding European patent application No. EP 07 25 1108.

*Primary Examiner* — Steven Kau
(74) *Attorney, Agent, or Firm* — Cooper & Dunham LLP

(57) ABSTRACT

A disclosed method for setting multiple tones in a halftone process upon recording an image using ink includes the steps of: dividing the image into plural dot areas; and setting the multiple tones such that at least one dot area to which the ink is not attached is present between dot areas to which the ink is attached.

17 Claims, 29 Drawing Sheets

U.S. PATENT DOCUMENTS

| | | | |
|---|---|---|---|
| 6,012,797 | A | 1/2000 | Iwata et al. |
| 6,572,212 | B2 * | 6/2003 | Konno et al. ............... 347/19 |
| 6,906,825 | B1 * | 6/2005 | Nakahara et al. ............. 358/1.9 |
| 6,923,520 | B2 | 8/2005 | Oikawa et al. |
| 6,942,308 | B2 * | 9/2005 | Molinet et al. ............... 347/4 |
| 6,960,036 | B1 | 11/2005 | Fujita et al. |
| 7,354,126 | B2 * | 4/2008 | Tatsumi ...................... 347/15 |
| 7,532,362 | B2 * | 5/2009 | Fujimori ...................... 358/3.06 |
| 7,710,606 | B2 * | 5/2010 | Suzuki et al. ............... 358/3.14 |
| 2002/0024548 | A1 | 2/2002 | Gotoh et al. |
| 2004/0032446 | A1 | 2/2004 | Kanda |
| 2006/0044334 | A1 | 3/2006 | Fujita et al. |
| 2006/0181562 | A1 | 8/2006 | Hirano et al. |

FOREIGN PATENT DOCUMENTS

| | | |
|---|---|---|
| JP | 10-75375 | 3/1998 |
| JP | 2001-139849 | 5/2001 |
| JP | 2003-46777 | 2/2003 |
| JP | 2003-259118 | 9/2003 |
| JP | 2004-80065 | 3/2004 |
| JP | 2005-1221 | 1/2005 |
| JP | 2006-157436 | 6/2006 |

* cited by examiner

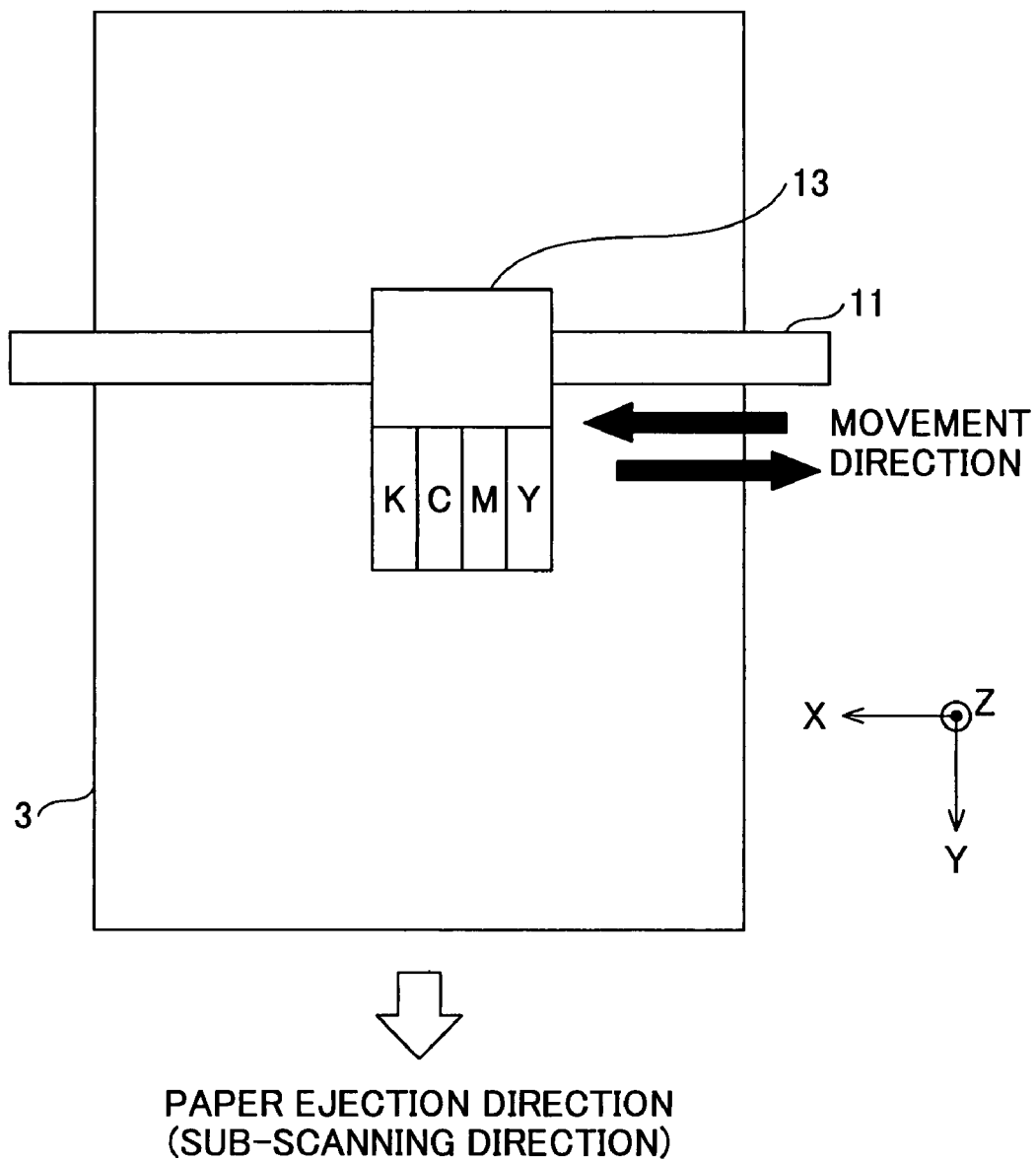

(a)  (b)

(a)  (b)  (c)

(a)  (b)  (c)  (d)

(a)  (b)

(a)    (b)

(a)

|  | GOING ROUTE | | RETURNING ROUTE | |
| --- | --- | --- | --- | --- |
|  | LIGHTNESS | DENSITY | LIGHTNESS | DENSITY |
| CONVENTIONAL PROCESS | 75.99 | 0.3 | 74.19 | 0.326 |
| PRESENT INVENTION | 74.6 | 0.32 | 73.98 | 0.329 |

(b)

|  | DIFFERENCE OF LIGHTNESS | DIFFERENCE OF DENSITY |
| --- | --- | --- |
| CONVENTIONAL PROCESS | 1.8 | 0.026 |
| PRESENT INVENTION | 0.62 | 0.009 |

| SMALL DROPLET | · |
| MEDIUM DROPLET | ● |
| LARGE DROPLET | ⬤ |

FIG.25

| 0 | 1 | 10 | 20 | 30 | 40 | 50 | 60 | 70 | 80 | 90 | 100 | 120 | 150 | 200 | 255 |
|---|---|---|---|---|---|---|---|---|---|---|---|---|---|---|---|
| 1 | 1 | 10 | 20 | 30 | 40 | 50 | 60 | 70 | 80 | 90 | 100 | 120 | 150 | 200 | 255 |
| 10 | 10 | 10 | 20 | 30 | 40 | 50 | 60 | 70 | 80 | 90 | 100 | 120 | 150 | 200 | 255 |
| 20 | 20 | 20 | 20 | 30 | 40 | 50 | 60 | 70 | 80 | 90 | 100 | 120 | 150 | 200 | 255 |
| 30 | 30 | 30 | 30 | 30 | 40 | 50 | 60 | 70 | 80 | 90 | 100 | 120 | 150 | 200 | 255 |
| 40 | 40 | 40 | 40 | 40 | 40 | 50 | 60 | 70 | 80 | 90 | 100 | 120 | 150 | 200 | 255 |
| 50 | 50 | 50 | 50 | 50 | 50 | 50 | 60 | 70 | 80 | 90 | 100 | 120 | 150 | 200 | 255 |
| 60 | 60 | 60 | 60 | 60 | 60 | 60 | 60 | 70 | 80 | 90 | 100 | 120 | 150 | 200 | 255 |
| 70 | 70 | 70 | 70 | 70 | 70 | 70 | 70 | 70 | 80 | 90 | 100 | 120 | 150 | 200 | 255 |
| 80 | 80 | 80 | 80 | 80 | 80 | 80 | 80 | 80 | 80 | 90 | 100 | 120 | 150 | 200 | 255 |
| 90 | 90 | 90 | 90 | 90 | 90 | 90 | 90 | 90 | 90 | 90 | 100 | 120 | 150 | 200 | 255 |
| 100 | 100 | 100 | 100 | 100 | 100 | 100 | 100 | 100 | 100 | 100 | 100 | 120 | 150 | 200 | 255 |
| 120 | 120 | 120 | 120 | 120 | 120 | 120 | 120 | 120 | 120 | 120 | 120 | 120 | 150 | 200 | 255 |
| 150 | 150 | 150 | 150 | 150 | 150 | 150 | 150 | 150 | 150 | 150 | 150 | 150 | 150 | 200 | 255 |
| 200 | 200 | 200 | 200 | 200 | 200 | 200 | 200 | 200 | 200 | 200 | 200 | 200 | 200 | 200 | 255 |
| 255 | 255 | 255 | 255 | 255 | 255 | 255 | 255 | 255 | 255 | 255 | 255 | 255 | 255 | 255 | 255 |

FIG.26

| 0 | 105 | 30 | 125 | 8 | 110 | 37 | 130 | 2 | 106 | 32 | 126 | 10 | 111 | 39 | 131 |
|---|---|---|---|---|---|---|---|---|---|---|---|---|---|---|---|
| 144 | 57 | 161 | 82 | 148 | 64 | 165 | 88 | 145 | 59 | 162 | 84 | 149 | 65 | 166 | 89 |
| 44 | 135 | 15 | 115 | 51 | 139 | 23 | 120 | 46 | 136 | 17 | 116 | 53 | 140 | 25 | 121 |
| 170 | 94 | 153 | 70 | 174 | 99 | 157 | 76 | 171 | 95 | 154 | 72 | 175 | 101 | 158 | 78 |
| 12 | 112 | 41 | 132 | 4 | 107 | 34 | 127 | 13 | 114 | 42 | 133 | 6 | 109 | 35 | 129 |
| 150 | 67 | 167 | 91 | 146 | 61 | 163 | 85 | 152 | 69 | 169 | 92 | 147 | 62 | 164 | 87 |
| 54 | 141 | 27 | 123 | 48 | 137 | 19 | 118 | 56 | 143 | 28 | 124 | 49 | 138 | 21 | 119 |
| 176 | 102 | 159 | 79 | 172 | 96 | 155 | 73 | 177 | 103 | 160 | 81 | 173 | 98 | 156 | 75 |
| 3 | 107 | 33 | 127 | 11 | 112 | 40 | 132 | 1 | 105 | 31 | 126 | 9 | 110 | 38 | 130 |
| 145 | 60 | 163 | 84 | 150 | 66 | 167 | 90 | 144 | 58 | 162 | 83 | 149 | 65 | 166 | 89 |
| 47 | 136 | 18 | 117 | 53 | 141 | 26 | 122 | 45 | 135 | 16 | 116 | 52 | 140 | 24 | 121 |
| 171 | 96 | 154 | 72 | 175 | 101 | 159 | 78 | 170 | 94 | 153 | 71 | 174 | 100 | 157 | 77 |
| 14 | 114 | 43 | 134 | 7 | 109 | 36 | 129 | 13 | 113 | 42 | 133 | 5 | 108 | 35 | 128 |
| 152 | 69 | 169 | 93 | 148 | 63 | 165 | 87 | 151 | 68 | 168 | 92 | 147 | 61 | 164 | 86 |
| 57 | 143 | 29 | 124 | 50 | 139 | 22 | 119 | 55 | 142 | 27 | 123 | 48 | 137 | 20 | 118 |
| 177 | 104 | 161 | 81 | 173 | 98 | 156 | 75 | 176 | 103 | 160 | 80 | 172 | 97 | 155 | 74 |

FIG.28

| 0 | 105 | 30 | 125 | 8 | 110 | 37 | 130 | 2 | 106 | 32 | 126 | 10 | 111 | 39 | 131 |
|---|---|---|---|---|---|---|---|---|---|---|---|---|---|---|---|
| 144 | 57 | 161 | 82 | 148 | 64 | 165 | 88 | 145 | 59 | 162 | 84 | 149 | 65 | 166 | 89 |
| 44 | 135 | 15 | 115 | 51 | 139 | 23 | 120 | 46 | 136 | 17 | 116 | 53 | 140 | 25 | 121 |
| 170 | 94 | 153 | 70 | 174 | 99 | 157 | 76 | 171 | 95 | 154 | 72 | 175 | 101 | 158 | 78 |
| 12 | 112 | 41 | 132 | 4 | 107 | 34 | 127 | 13 | 114 | 42 | 133 | 6 | 109 | 35 | 129 |
| 150 | 67 | 167 | 91 | 146 | 61 | 163 | 85 | 152 | 69 | 169 | 92 | 147 | 62 | 164 | 87 |
| 54 | 141 | 27 | 123 | 48 | 137 | 19 | 118 | 56 | 143 | 28 | 124 | 49 | 138 | 21 | 119 |
| 176 | 102 | 159 | 79 | 172 | 96 | 155 | 73 | 177 | 103 | 160 | 81 | 173 | 98 | 156 | 75 |
| 3 | 107 | 33 | 127 | 11 | 112 | 40 | 132 | 1 | 105 | 31 | 126 | 9 | 110 | 38 | 130 |
| 145 | 60 | 163 | 84 | 150 | 66 | 167 | 90 | 144 | 58 | 162 | 83 | 149 | 65 | 166 | 89 |
| 47 | 136 | 18 | 117 | 53 | 141 | 26 | 122 | 45 | 135 | 16 | 116 | 52 | 140 | 24 | 121 |
| 171 | 96 | 154 | 72 | 175 | 101 | 159 | 78 | 170 | 94 | 153 | 71 | 174 | 100 | 157 | 77 |
| 14 | 114 | 43 | 134 | 7 | 109 | 36 | 129 | 13 | 113 | 42 | 133 | 5 | 108 | 35 | 128 |
| 152 | 69 | 169 | 93 | 148 | 63 | 165 | 87 | 151 | 68 | 168 | 92 | 147 | 61 | 164 | 86 |
| 57 | 143 | 29 | 124 | 50 | 139 | 22 | 119 | 55 | 142 | 27 | 123 | 48 | 137 | 20 | 118 |
| 177 | 104 | 161 | 81 | 173 | 98 | 156 | 75 | 176 | 103 | 160 | 80 | 172 | 97 | 155 | 74 |

FIG.29

| 178 | 219 | 193 | 224 | 182 | 220 | 197 | 225 | 179 | 219 | 194 | 224 | 183 | 221 | 197 | 226 |
|---|---|---|---|---|---|---|---|---|---|---|---|---|---|---|---|
| 229 | 205 | 234 | 213 | 230 | 207 | 236 | 214 | 229 | 205 | 235 | 213 | 231 | 207 | 236 | 215 |
| 200 | 227 | 186 | 222 | 202 | 228 | 190 | 223 | 200 | 227 | 187 | 222 | 203 | 228 | 191 | 223 |
| 237 | 216 | 232 | 209 | 239 | 217 | 233 | 211 | 238 | 216 | 232 | 210 | 239 | 218 | 233 | 211 |
| 184 | 221 | 198 | 226 | 180 | 220 | 195 | 225 | 185 | 221 | 199 | 226 | 181 | 220 | 196 | 225 |
| 231 | 208 | 236 | 215 | 230 | 206 | 235 | 214 | 231 | 209 | 237 | 216 | 230 | 206 | 235 | 214 |
| 203 | 228 | 192 | 223 | 201 | 227 | 188 | 222 | 204 | 229 | 193 | 224 | 202 | 227 | 189 | 223 |
| 239 | 218 | 234 | 212 | 238 | 217 | 232 | 210 | 240 | 219 | 234 | 212 | 238 | 217 | 233 | 210 |
| 179 | 219 | 195 | 225 | 184 | 221 | 198 | 226 | 178 | 219 | 194 | 224 | 183 | 220 | 197 | 225 |
| 230 | 206 | 235 | 213 | 231 | 208 | 236 | 215 | 229 | 205 | 234 | 213 | 230 | 207 | 236 | 215 |
| 201 | 227 | 188 | 222 | 203 | 228 | 191 | 223 | 200 | 227 | 187 | 222 | 203 | 228 | 190 | 223 |
| 238 | 217 | 232 | 210 | 239 | 218 | 233 | 212 | 237 | 216 | 232 | 209 | 239 | 218 | 233 | 211 |
| 186 | 221 | 199 | 226 | 181 | 220 | 196 | 225 | 185 | 221 | 198 | 226 | 180 | 220 | 195 | 225 |
| 231 | 209 | 237 | 216 | 230 | 207 | 236 | 214 | 231 | 208 | 237 | 215 | 230 | 206 | 235 | 214 |
| 204 | 229 | 193 | 224 | 202 | 228 | 189 | 223 | 204 | 229 | 192 | 224 | 201 | 227 | 189 | 222 |
| 240 | 219 | 234 | 213 | 238 | 217 | 233 | 211 | 240 | 218 | 234 | 212 | 238 | 217 | 232 | 210 |

FIG.30

| 241 | 250 | 244 | 253 | 242 | 251 | 244 | 253 | 241 | 251 | 244 | 253 | 242 | 251 | 244 | 253 |
|---|---|---|---|---|---|---|---|---|---|---|---|---|---|---|---|
| 999 | 246 | 999 | 248 | 999 | 246 | 999 | 249 | 999 | 246 | 999 | 248 | 999 | 247 | 999 | 249 |
| 245 | 254 | 243 | 252 | 245 | 254 | 243 | 252 | 245 | 254 | 243 | 252 | 245 | 254 | 243 | 252 |
| 999 | 249 | 999 | 247 | 999 | 250 | 999 | 248 | 999 | 249 | 999 | 247 | 999 | 250 | 999 | 248 |
| 242 | 251 | 245 | 254 | 241 | 251 | 244 | 253 | 242 | 251 | 245 | 254 | 242 | 251 | 244 | 253 |
| 999 | 247 | 999 | 249 | 999 | 246 | 999 | 248 | 999 | 247 | 999 | 249 | 999 | 246 | 999 | 249 |
| 246 | 254 | 243 | 252 | 245 | 254 | 243 | 252 | 246 | 999 | 244 | 253 | 245 | 254 | 243 | 252 |
| 999 | 250 | 999 | 248 | 999 | 250 | 999 | 247 | 999 | 250 | 999 | 248 | 999 | 250 | 999 | 247 |
| 241 | 251 | 244 | 253 | 242 | 251 | 244 | 254 | 241 | 250 | 244 | 253 | 242 | 251 | 244 | 253 |
| 999 | 246 | 999 | 248 | 999 | 247 | 999 | 249 | 999 | 246 | 999 | 248 | 999 | 246 | 999 | 249 |
| 245 | 254 | 243 | 252 | 246 | 254 | 243 | 252 | 245 | 254 | 243 | 252 | 245 | 254 | 243 | 252 |
| 999 | 249 | 999 | 247 | 999 | 250 | 999 | 248 | 999 | 249 | 999 | 247 | 999 | 250 | 999 | 248 |
| 243 | 251 | 245 | 254 | 242 | 251 | 244 | 253 | 242 | 251 | 245 | 254 | 241 | 251 | 244 | 253 |
| 999 | 247 | 999 | 249 | 999 | 246 | 999 | 249 | 999 | 247 | 999 | 249 | 999 | 246 | 999 | 248 |
| 246 | 999 | 244 | 253 | 245 | 254 | 243 | 252 | 246 | 999 | 243 | 252 | 245 | 254 | 243 | 252 |
| 999 | 250 | 999 | 248 | 999 | 250 | 999 | 247 | 999 | 250 | 999 | 248 | 999 | 250 | 999 | 247 |

FIG.32

| 46 | 999 | 23 | 999 | 999 | 29 | 999 | 11 | 999 | 999 | 49 | 999 | 26 | 999 | 999 |
|---|---|---|---|---|---|---|---|---|---|---|---|---|---|---|
| 999 | 11 | 999 | 999 | 55 | 999 | 16 | 999 | 999 | 39 | 999 | 4 | 999 | 999 | 30 |
| 16 | 999 | 999 | 39 | 999 | 1 | 999 | 999 | 44 | 999 | 20 | 999 | 999 | 53 | 999 |
| 999 | 999 | 45 | 999 | 26 | 999 | 999 | 31 | 999 | 11 | 999 | 999 | 37 | 999 | 2 |
| 999 | 32 | 999 | 11 | 999 | 999 | 52 | 999 | 17 | 999 | 999 | 47 | 999 | 24 | 999 |
| 54 | 999 | 17 | 999 | 999 | 41 | 999 | 3 | 999 | 999 | 35 | 999 | 8 | 999 | 999 |
| 999 | 4 | 999 | 999 | 28 | 999 | 23 | 999 | 999 | 43 | 999 | 19 | 999 | 999 | 50 |
| 25 | 999 | 999 | 48 | 999 | 13 | 999 | 999 | 54 | 999 | 6 | 999 | 999 | 36 | 999 |
| 999 | 999 | 38 | 999 | 0 | 999 | 999 | 36 | 999 | 15 | 999 | 999 | 46 | 999 | 21 |
| 999 | 53 | 999 | 20 | 999 | 999 | 46 | 999 | 25 | 999 | 999 | 29 | 999 | 8 | 999 |
| 30 | 999 | 10 | 999 | 999 | 33 | 999 | 7 | 999 | 999 | 51 | 999 | 16 | 999 | 999 |
| 999 | 24 | 999 | 999 | 55 | 999 | 16 | 999 | 999 | 41 | 999 | 1 | 999 | 999 | 34 |
| 2 | 999 | 999 | 40 | 999 | 5 | 999 | 999 | 30 | 999 | 22 | 999 | 999 | 56 | 999 |
| 999 | 999 | 34 | 999 | 26 | 999 | 999 | 51 | 999 | 12 | 999 | 999 | 44 | 999 | 6 |
| 999 | 52 | 999 | 12 | 999 | 999 | 43 | 999 | 2 | 999 | 999 | 34 | 999 | 27 | 999 |

| 0 | 8 | 2 | 10 |
|---|---|---|---|
| 12 | 4 | 14 | 6 |
| 3 | 11 | 1 | 9 |
| 15 | 7 | 13 | 5 |

METHOD AND DEVICE FOR SETTING MULTIPLE TONES IN HALFTONE PROCESS TO PREVENT MIXING OF ADJACENT INK DOTS

BACKGROUND OF THE INVENTION

1. Technical Field

This disclosure generally relates to a setting method, an image recording apparatus, program, and a recording medium and more particularly to a setting method upon recording an image using ink, an image recording apparatus for recording images using ink, a program used in the image recording apparatus, and a recording medium in which the program is recorded.

2. Description of the Related Art

In image recording apparatuses such as ink-jet recording apparatuses, images are recorded on paper by attaching ink to paper in accordance with image data. In recent years, the demand for quality of recorded images has been increasing year by year. In view of this, what is called a halftone process has been conducted in which the number of dots per unit area is controlled (refer to Patent Document 1, for example).

However, when landing accuracy, which is accuracy of how ink droplets are attached to object positions on paper, is low in ink-jet recording apparatuses, the quality of recorded images may be deteriorated due to shift of landing positions upon attachment of ink to paper in which adjacent ink droplets are mixed.

Patent Document 1: Japanese Laid-Open Patent Application No. 2004-80065

SUMMARY

In an aspect of this disclosure, there is provide a setting method capable of preventing adjacent ink droplets from becoming mixed even when the landing accuracy of ink droplets is low.

In another aspect of this disclosure, there is provide an image recording apparatus capable of recording high-quality images without causing an increase of cost or a reduced recording speed.

In another aspect of this disclosure, there are provide a program executed in the image recording apparatus so as to enable recording of high-quality images without causing an increase of cost or a reduced recording speed, and a recording medium in which the program is recorded.

In another aspect, there is provided a method for setting multiple tones in a halftone process upon recording an image using ink, the method for setting multiple tones comprising the steps of: dividing the image into plural dot areas; and setting the multiple tones such that at least one dot area to which the ink is not attached is present between dot areas to which the ink is attached.

In accordance with this, in the halftone process, the multiple tones are set such that at least one dot area to which the ink is not attached is present between dot areas to which the ink is attached. Thus, it is possible to prevent adjacent ink droplets from becoming mixed even when the landing accuracy of ink droplets is low.

In another aspect, there is provided an image recording apparatus for recording an image using ink, the image recording apparatus comprising: a head including at least one nozzle for discharging the ink; a setting device for dividing the image into plural dot areas upon setting multiple tones in a halftone process on the image and for setting the multiple tones such that at least one dot area to which the ink is not discharged is present between dot areas to which the ink is discharged; and a control device for controlling the head in accordance with setting in the setting device In accordance with this, in the halftone process, the multiple tones are set such that at least one dot area to which the ink is not discharged is present between dot areas to which the ink is discharged. Thus, it is possible to prevent adjacent ink droplets from becoming mixed even when the landing accuracy of ink droplets is low. As a result of this, it is possible to record high-quality images without causing an increase of cost or a reduced recording speed.

In another aspect, there is provided a computer-readable program used in an image recording apparatus for recording an image using ink which, when executed by a computer for controlling the image recording apparatus, causes the computer to perform a process comprising: dividing the image into plural dot areas upon setting multiple tones in a halftone process on the image; and setting the multiple tones such that at least one dot area to which the ink is not discharged is present between dot areas to which the ink is discharged.

In another aspect, there is provided a computer-readable recording medium storing the aforementioned computer-readable program.

Other aspects, features and advantages will become more apparent from the following detailed description when read in conjunction with the accompanying drawings.

BRIEF DESCRIPTION OF THE DRAWINGS

FIG. 3 is a diagram showing a conveying direction of paper and movement of a carriage in FIG. 1;

FIG. 25 is a diagram showing numerical values in a matrix indicating the density of the original image shown in FIG. 24;

FIG. 26 is a diagram showing an example of a dither mask in a case of two values;

FIG. 28 is a diagram showing a dither mask for small droplets in a case of four values;

FIG. 29 is a diagram showing a dither mask for medium droplets in a case of four values;

FIG. 30 is a diagram showing a dither mask for large droplets in a case of four values;

FIG. 32 is a diagram showing a dither mask obtained by employing the present invention;

DETAILED DESCRIPTION OF THE PREFERRED EMBODIMENTS

Figure 1:
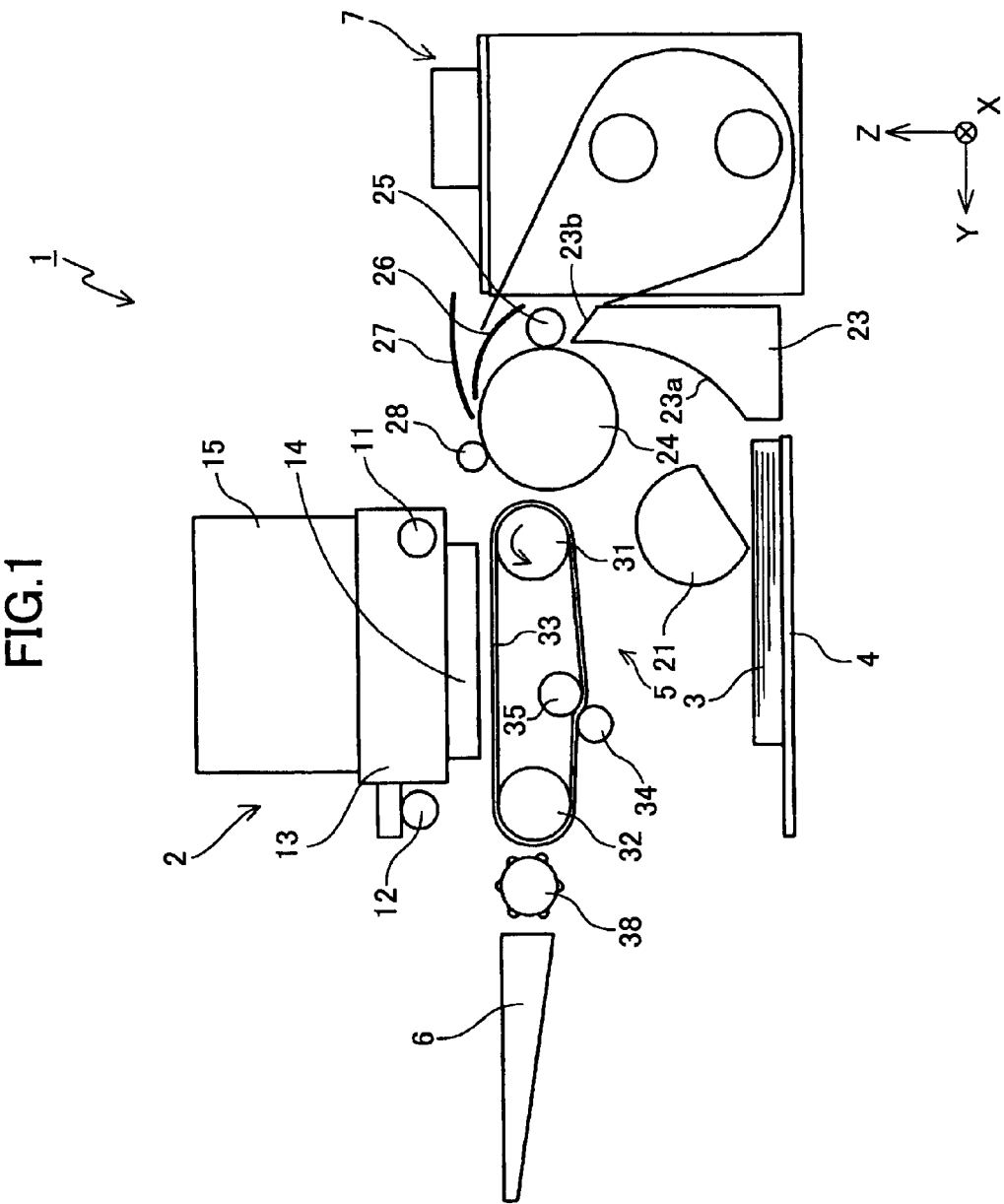
FIG. 1 is a schematic diagram of an ink-jet recording apparatus according to an embodiment of the present invention.
Figure 2:
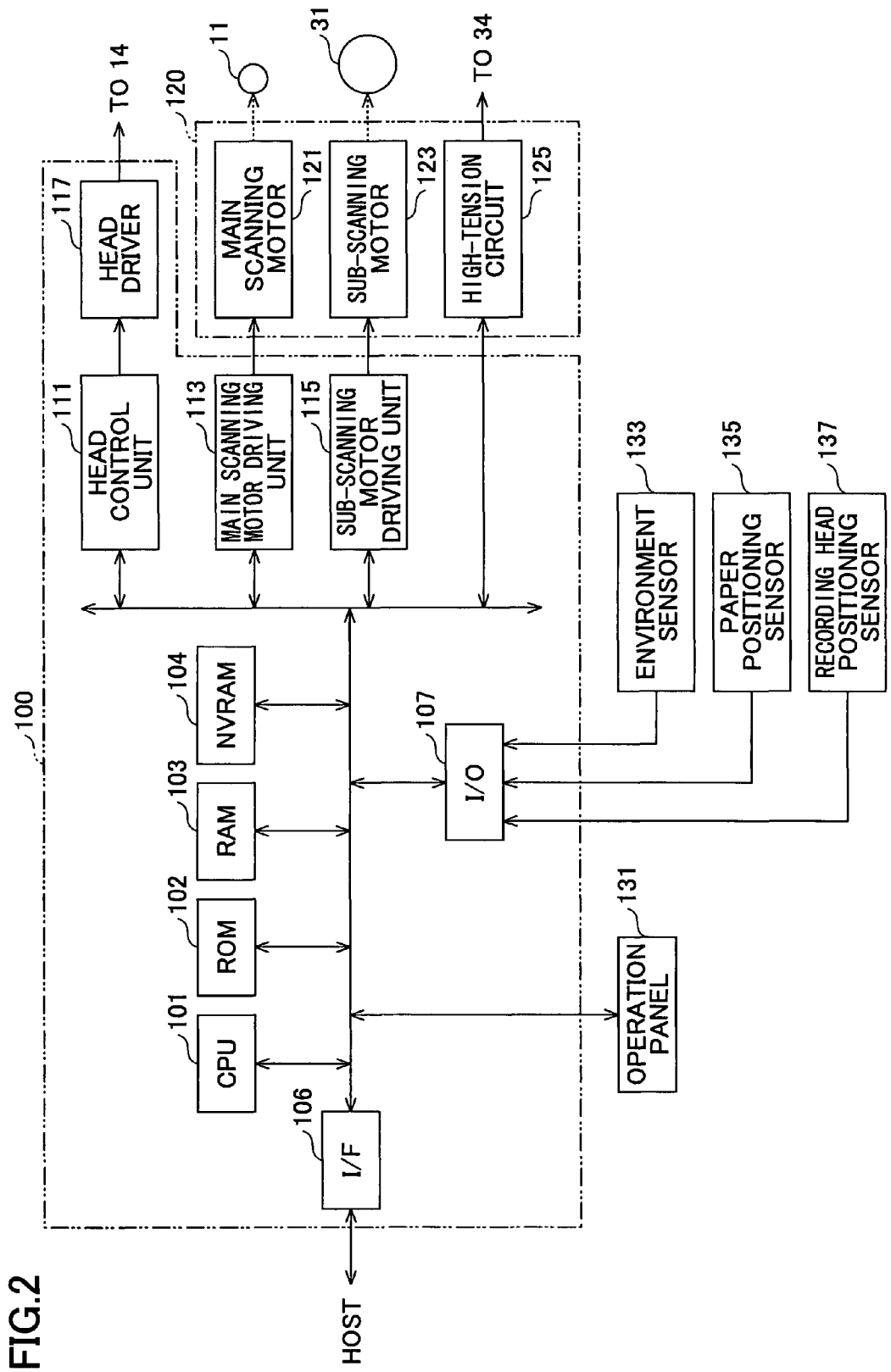
FIG. 2 is a block diagram showing a control device and a driving system in the ink-jet recording apparatus in FIG. 1.

In the following, embodiments of the present invention will be described with reference to FIGS. 1 to 21-(b). FIGS. 1 and 2 show schematic structures of an ink-jet recording apparatus as an image recording apparatus according to an embodiment of the present invention. The present embodiment is described on the assumption that a main scanning direction is an X axis direction, a sub-scanning direction is a Y axis direction, and a direction orthogonal to the X axis and the Y axis is a Z axis direction.

[Structure of the Ink-Jet Recording Apparatus]

An ink-jet recording apparatus 1 shown in FIG. 1 includes an image forming unit 2, a paper feed tray 4, a conveying mechanism 5, a paper ejection tray 6, a duplex unit 7, an operation panel 131, an environment sensor 133, a paper positioning sensor 135, a recording head positioning sensor 137, a control device 100, a driving system 120, and the like.

As shown in FIG. 1, the image forming unit 2 includes a carriage 13, a recording head 14, an ink cartridge 15, and the like.

As shown in FIG. 1, the conveying mechanism 5 includes a paper feed runner (semicircular runner) 21, a conveying guide unit 23, a conveying roller 24, a pressurizing runner 25, a guide member 26, a guide member 27, a pressing runner 28, a driving roller 31, a driven (tension) roller 32, a conveying belt 33, a charging roller 34, a guide roller 35, a paper ejection roller 38, and the like.

As shown in FIG. 2, the control device 100 includes a CPU 101, a ROM 102, a RAM 103, a nonvolatile memory (NVRAM) 104, an interface (I/F) 106, an input-output port (I/O) 107, a head control unit 111, a main scanning motor driving unit 113, a sub-scanning motor driving unit 115, a head driver 117, and the like.

As shown in FIG. 2, the driving system 120 includes a main scanning motor 121, a sub-scanning motor 123, a high-tension circuit 125, and the like.

[Paper Feed Tray]

The paper feed tray 4 is disposed at a lower end portion of a body of the ink-jet recording apparatus and is capable of loading multiple sheets of paper 3.

[Image Forming Unit]

As shown in FIG. 1, the carriage 13 is held slidably in the X axis direction by two guide shafts 11 and 12 extending in the X axis direction. Further, the guide shaft 11 is rotatably driven by the main scanning motor 121. Accordingly, when the guide shaft 11 is rotatably driven by the main scanning motor 121, the carriage 13 is moved in the X axis direction as shown in FIG. 3, for example.

The recording head 14 and the ink cartridge 15 are installed on the carriage 13, so that when the carriage 13 is moved in the X axis direction, the recording head 14 and the ink cartridge 15 are also moved in the X axis direction.

Figure 4C:
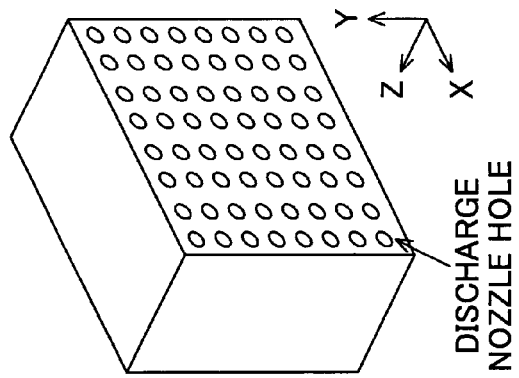
FIG. 4C is a diagram showing a recording head in FIG. 1.
Figure 4B:
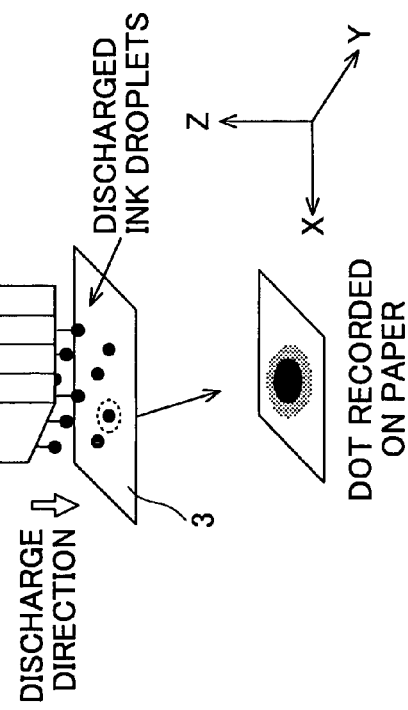
FIG. 4B is a diagram showing a recording head in FIG. 1.
Figure 4A:
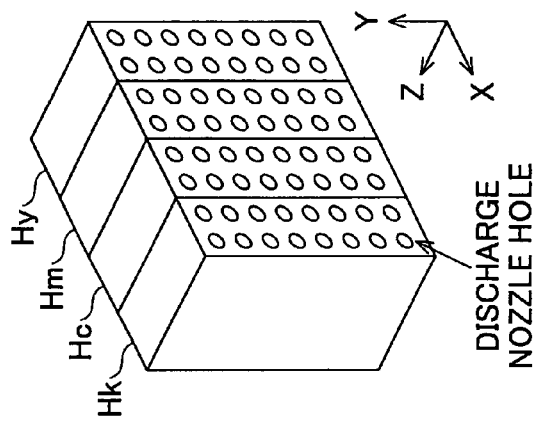
FIG. 4A is a diagram showing a recording head in FIG. 1.

As shown in FIGS. 4A and 4B, for example, the recording head 14 includes four ink-jet heads (Hk, Hc, Hm, and Hy) in which plural discharge nozzle holes for discharging ink droplets in a −Z direction are arranged and formed. The ink-jet head Hk is for black (K) ink, the ink-jet head Hc is for cyan (C) ink, the ink-jet head Hm is for magenta (M) ink, and the ink-jet head Hy is for yellow (Y) ink. In addition, order of the ink-jet heads is not limited to FIG. 4A and the ink-jet heads may be integrated as shown in FIG. 4C, for example.

The recording head 14 also includes an energy generation mechanism for discharging ink. Examples that may be used for the energy generation mechanism include a piezoelectric actuator using a piezoelectric effect with the use of a piezoelectric element, a thermal actuator using a phase change from film boiling of liquid with the use of an electrothermal element such as a heat element, a shape memory actuator using a metallic phase change from a thermal change with the use of a shape memory alloy, an electrostatic actuator using electrostatic force, and the like. The energy generation mechanism is driven through a driving signal from the head driver 117.

For example, in a case of the piezoelectric actuator, pressure energy is generated by steeply reducing a capacity of a liquid chamber filled with ink using the piezoelectric element, so that the ink is discharged from the nozzle due to the pressure energy. In a case of the thermal actuator, thermal energy is applied to the ink from the electrothermal element, so that air bubbles are generated in the ink due to the thermal energy and the ink is discharged from the nozzle.

The ink cartridge 15 includes a black ink cartridge, a cyan ink cartridge, a magenta ink cartridge, and a yellow ink cartridge, and supplies each ink to the recording head 14. Instead of using the ink cartridge 15, a sub-tank may be installed so that the ink is filled or supplied from a main tank to the sub-tank. The ink cartridge 15 is detachable from the carriage 13.

[Conveying Mechanism]

With reference to FIG. 1, the paper feed runner 21 is disposed on a +Z side relative to the paper feed tray 4. When a request for taking out paper is issued from the control device 100, the paper 3 on top of the plural paper 3 on the +Z side loaded on the paper feed tray 4 is brought into contact with the paper feed runner 21 and sent to the conveying guide unit 23 through an up-down mechanism (not shown in the drawings).

The conveying guide unit 23 is disposed on a −Y side relative to the paper feed runner 21. The conveying guide unit 23 guides the paper 3 upward (+Z direction) along a guide surface 23$a$ after the paper 3 is taken out from the paper feed tray 4 by the paper feed runner 21. When printing is performed on both faces of the paper 3, the conveying guide unit 23 guides the paper 3 upward (+Z direction) along a guide surface 23$b$ after the paper 3 is reversed in the duplex unit 7 disposed on the −Y side relative to the conveying guide unit 23.

The conveying roller 24 and the pressurizing runner 25 are disposed on the +Z side relative to the conveying guide unit 23. While the paper 3 from the conveying guide unit 23 is pressed on the conveying roller 24 by the pressurizing runner 25, the paper 3 is moved in the +Z direction in accordance with rotation of the conveying roller 24. The conveying roller 24 is configured to be rotated substantially at the same time as when the ink-jet recording apparatus 1 is powered on.

The guide member 26, the guide member 27, and the pressing runner 28 are disposed on the +Z side relative to the conveying guide unit 23. The guide member 26 changes a movement direction of the paper 3 from the +Z direction to a +Y direction. The guide member 27 guides the paper 3 such that the paper 3 returned for duplex printing is directed toward the duplex unit 7. The pressing runner 28 presses the paper 3 whose movement direction is changed to the +Y direction by the guide member 26 and the paper 3 returned from the conveying belt 33 for duplex printing on the conveying roller 24.

The conveying belt 33 is an endless annular member. The conveying belt 33 is wound on the driving roller 31 and the driven roller 32 and disposed on a +Y side relative to the conveying guide unit 23 and a −Z side relative to the recording head 14. The paper 3 pressed on the conveying roller 24 by the pressing runner 28 is transferred from the conveying roller 24 to the conveying belt 33 in accordance with the rotation of the conveying roller 24.

Figure 5:
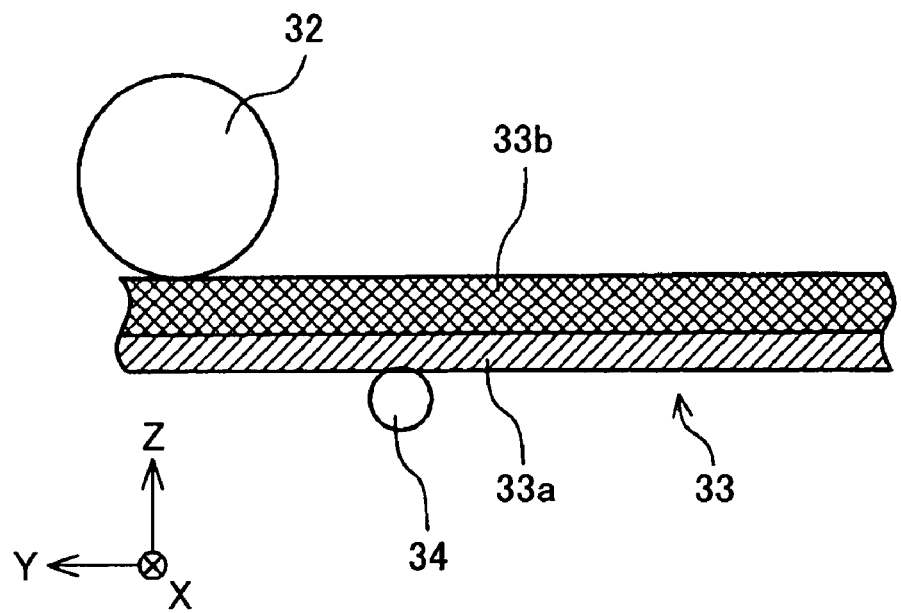
FIG. 5 is a diagram showing a conveying belt in FIG. 1.

As shown in FIG. 5, for example, the conveying belt 33 has a double-layered structure made of a surface layer 33$a$ and a rear layer 33$b$. In this case, both surface layer 33$a$ and rear layer 33$b$ are formed using a pure resin material (ETFE pure material, for example) having a thickness of about 40 μm. Although resistance is not controlled on a surface (face to which the paper 3 is attracted) of the surface layer 33$a$, resistance is controlled using carbon on a surface (face brought into contact with the driving roller 31 and the driven roller 32) of the rear layer 33$b$. The rear layer 33$b$ is also referred to as a middle resistive layer or an earth layer.

The driving roller 31 is configured to be rotated in the counterclockwise direction by the sub-scanning motor 123. Thus, the conveying belt 33 is rotated in the counterclockwise direction.

The charging roller 34 is disposed such that it is brought into contact with the surface layer 33$a$ of the conveying belt 33 and rotated in accordance with the rotation of the conveying belt 33. Further, the charging roller 34 is supplied with a high voltage from the high-tension circuit 125. Accordingly, when the high voltage is applied to the charging roller 34, the conveying belt 33 is charged.

When the paper 3 is transferred to the positively charged conveying belt 33, an inside of the paper 3 is polarized, in which electric charges having a reversed polarity relative to electric charges on the conveying belt 33 are induced on a face in contact with the conveying belt 33 and the electric charges on the conveying belt 33 and the electric charges induced on the paper 3 are electrostatically pulling each other, so that the paper 3 is electrostatically attracted to the conveying belt 33. In accordance with this, warping and concavity and convexity of the paper 3 firmly attracted to the conveying belt 33 are corrected, so that a highly plain face is formed, namely, the paper 3 is conveyed while flatness is maintained.

The guide roller 35 is disposed on a position facing the charging roller 34 across the conveying belt 33 and presses the conveying belt 33 on the charging roller 34. Thus, when the driving roller 31 is rotated, the driven roller 32, the conveying belt 33, the charging roller 34, and the guide roller 35 are rotated substantially at the same time.

The paper ejection roller 38 is disposed on the +Y side relative to the conveying belt 33 and sends the paper 3 to the paper ejection tray 6. In addition, the paper ejection roller 38 is configured to be rotated substantially at the same time as when the ink-jet recording apparatus 1 is powered on. Residual ink attached to the conveying belt 33 is removed by a cleaning roller (not shown in the drawings).

[Duplex Unit]

The duplex unit 7 is disposed on the −Y side relative to the conveying mechanism 5 and used upon performing duplex printing on the paper 3. In the duplex unit 7, the paper 3 after printing on one face (surface) is performed is conveyed in the opposite direction (−Y direction in this case) by the conveying mechanism 5, guided by the guide member 27, and taken in the duplex unit 7. After the paper 3 is reversed inside the duplex unit 7, the paper 3 is conveyed to the conveying roller 24 along the guide surface 23$b$ and transferred to the conveying belt 33.

[Control Device]

The I/F 106 is a bidirectional communication interface with a host (external devices including information processing devices such as personal computers (hereafter referred to as "PC"), image reading devices such as image scanners, imaging devices such as digital cameras, and the like). Print data including image data is input from the host via the I/F 106. A form of connection with the host may be wireless connection using infrared or the like in addition to cable connection using a communication line such as a communication cable (USB cable, for example). Further, the I/F 106 may be connected to the host via a LAN or a network such as the Internet.

The ROM 102 stores various types of programs including a program according to the present invention written in a code decodable in the CPU 101, various types of fixed data (font data, for example) necessary for there programs, and the like.

The RAM 103 is a working memory in which print data from the host, dot pattern data described later, and the like are temporarily stored.

The NVRAM 104 is capable of holding data even when the control device 100 is powered off. The NVRAM 104 stores data repeatedly used and the like.

The I/O 107 has a parallel port for signal input and a parallel port for signal output. The parallel port for signal input includes the above-mentioned environment sensor 133, the paper positioning sensor 135, the recording head positioning sensor 137, and the like connected thereto. The environment sensor 133 measures temperature and humidity in the vicinity of the recording head 14, the paper positioning sensor 135 detects a position of the paper 3 on the conveying belt 33, and the recording head positioning sensor 137 detects a position of the recording head 14 in the main scanning direction. Information on the paper position from the paper positioning sensor 135 is notified to the CPU 101 and the sub-scanning motor driving unit 115. Further, information on the recording head position from the recording head positioning sensor 137 is notified top the CPU 101, the sub-scanning motor driving unit 115, and the main scanning motor driving unit 113.

The head control unit 111 includes a ROM storing data on various types of driving waveforms (driving signals), a waveform generation circuit including a D/A converter for converting the data on driving waveforms read out from the ROM from digital to analog, a driving waveform generation circuit including an amplifier for amplifying output signals of the waveform generation circuit, and the like (none of them is shown in the drawings). In addition, the data on various types of driving waveforms may be stored in the ROM 102.

Upon recording, the head control unit 111 takes out dot pattern data corresponding to a single row from the RAM 103, converts the dot pattern data for a single row to serial data, and transmits the converted data to the head driver 117 in synchronization with a clock signal. Further, the head control unit 111 transmits a latch signal to the head driver 117 at predetermined time.

The head driver 117 includes a shift register to which the clock signal and the serial data from the head control unit 111 is input, a latch circuit for latching register values from the shift register using the latch signal from the head control unit 111, a level conversion circuit (level shifter) for changing levels of output values of the latch circuit, and an analog switch array in which on/off control is made in accordance with an output signal of the level shifter. In accordance with the on/off of the analog switch array, a predetermined driving waveform is applied to the energy generation mechanism of the recording head 14.

The main scanning motor driving unit 113 generates a driving signal for driving the main scanning motor 121. The driving signal generated in the main scanning motor driving unit 113 is output to the main scanning motor 121. In addition, when the ink-jet recording apparatus 1 is powered on, the main scanning motor driving unit 113 drives the main scanning motor 121 while referring to the above-mentioned recording head position information and moves the recording head 14 to a recording start position in the main scanning direction. Further, when the recording is started, the main scanning motor driving unit 113 drives the main scanning motor 121 in synchronization with the clock signal form the head control unit 111. In this case, recording is performed in both going route and returning route of the recording head 14.

The sub-scanning motor driving unit 115 generates a driving signal for driving the sub-scanning motor 123. The driving signal generated in the sub-scanning motor driving unit 115 is output to the sub-scanning motor 123. The sub-scanning motor driving unit 115 refers to the above-mentioned paper position information. When the sub-scanning motor driving unit 115 confirms that the paper 3 has achieved a predetermined position on the conveying belt 33, the sub-scanning motor driving unit 115 temporarily stops the sub-scanning motor 123. Further, when the recording is started, the sub-scanning motor driving unit 115 controls the sub-scanning motor 123 while referring to the above-mentioned recording head position information and the paper position information. In other words, when recording for a single row is finished, the sub-scanning motor driving unit 115 controls the sub-scanning motor 123 such that the next row is a recording position of the recording head 14.

The CPU 101 controls an entire portion of the ink-jet recording apparatus 1 in accordance with the program stored in the ROM 102.

The control device 100 includes the operation panel 131 connected thereto. The operation panel 131 has a display device and an input device. Moreover, the control device 100 includes the high-tension circuit 125 connected thereto. In the high-tension circuit 125, the CPU 101 selects one of a status where a positive high voltage is applied to the charging roller 34 (hereafter referred to as a "positive voltage application status"), a status where a negative high voltage is applied to the charging roller 34 (hereafter referred to as a "negative voltage application status"), and a status where no high voltage is applied to the charging roller 34 (hereafter referred to as an "off status").

[Conventional Dither Process]

The following describes a conventional dither process used so as to express halftones (refer to Japanese Laid-Open Patent Application No. 2004-80065, for example).

In the dither process, a dither mask has been conventionally used in which a diagonal line base with an angle of 45 degrees is used, continuity of tone is maintained in all tones, and high-pass filter characteristics are provided taking into consideration characteristics of human sight.

Figure 6:
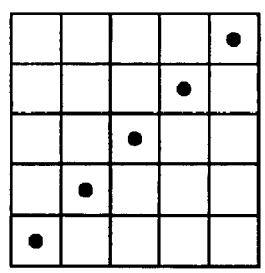
FIG. 6 is a diagram showing a minimum unit pattern of a diagonal line base.

A unit mask of a diagonal line base as shown in FIG. 6 will be described. Although the unit mask has a base line repeated in every five dots, the size may be 4×4, 3×3, or larger than these sizes.

In the following description, a "dot" refers to not only a circular portion formed by attaching an ink droplet but also each of multiple small areas (dot area=pixel) obtained by dividing an image area in a matrix manner so as to have portions to which ink droplets are attached.

Figure 7:
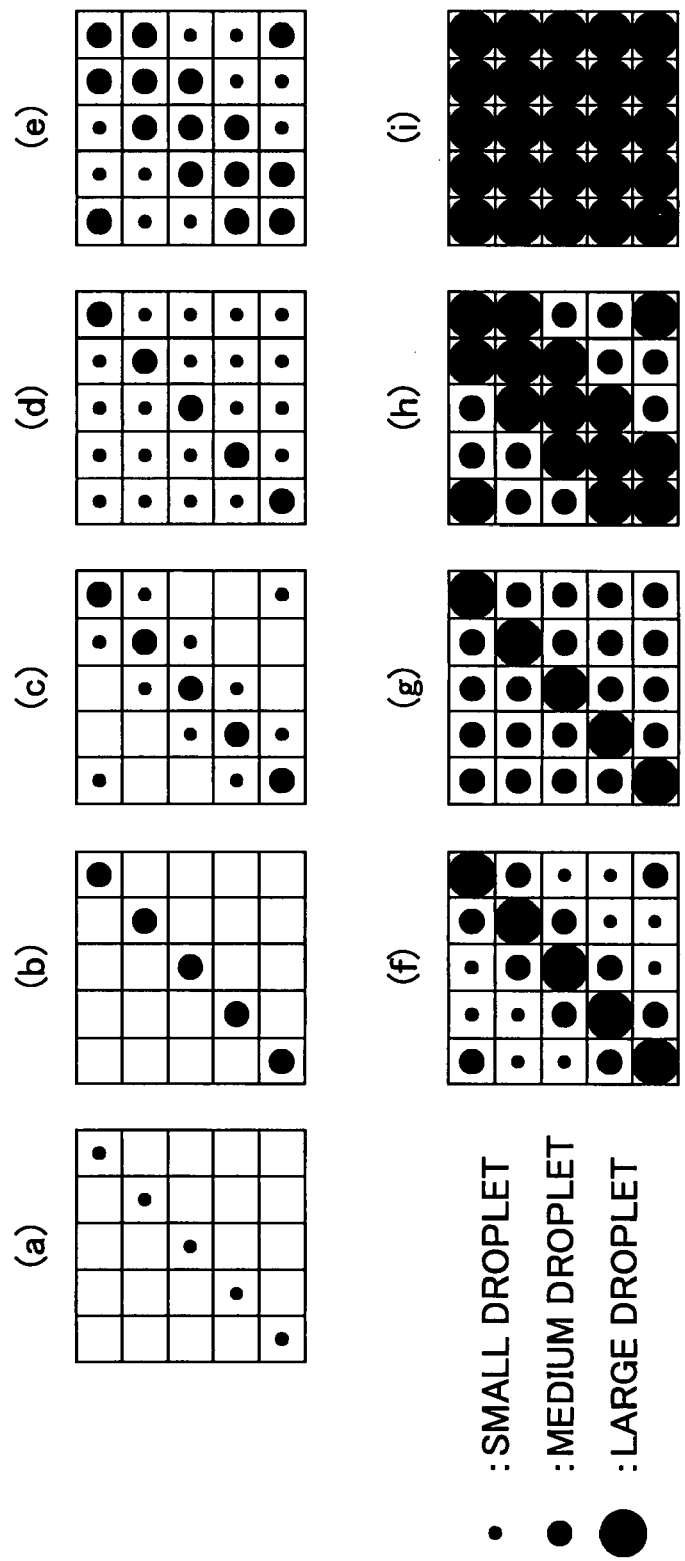
FIG. 7 is a diagram showing tones expressed in a conventional halftone process.

Next, as shown in FIG. 7-(a) to FIG. 7-(i), for example, tones are expressed by gradually thickening the base line of the unit mask. In this case, three types of diameter of ink droplet, namely, large droplet/medium droplet/small droplet are used.

In the 5×5 unit mask and ones having a similar size, the number of tones is limited. For example, in order to express 256 tones in two values (dot/blank), at least 16×16 mask size is necessary. In order to express 256 tones in four values (blank/small droplet/medium droplet/large droplet), at least 8×8 mask size is necessary.

Figure 8:
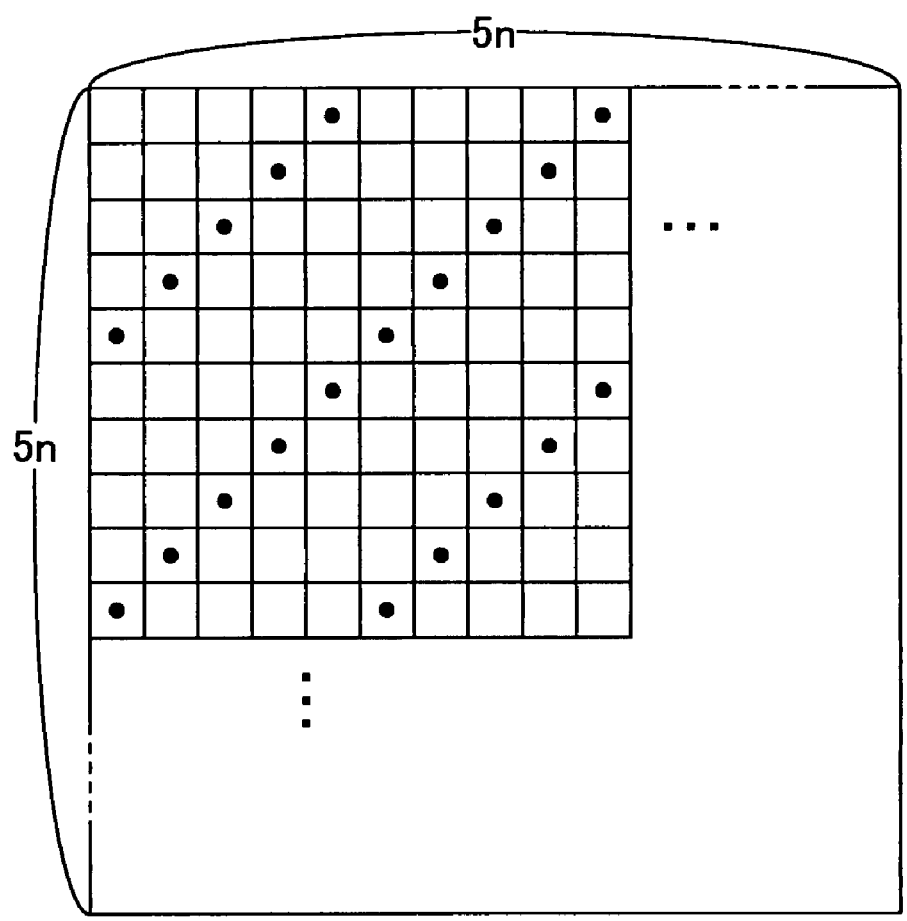
FIG. 8 is a diagram showing a size of a dither mask used in practice.
Figures 9, 10:
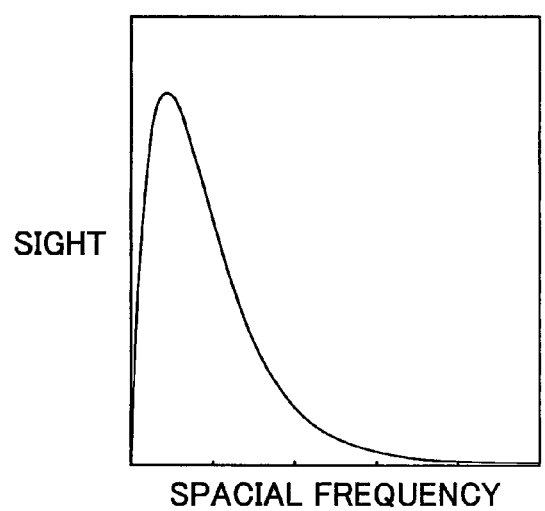
FIG. 9 is a diagram showing a threshold matrix used in a conventional halftone process.
FIG. 10 is a diagram showing characteristics of human sight.

In accordance with this, as shown in FIG. 8, a dither mask (also referred to as a threshold mask) of 5n×5n (n: arbitrary integer) is used in practice where the 5×5 unit mask is used as a minimum unit and the mask size is further enlarged. The tones are expressed by determining an arrangement of dots (hereafter referred to as "discharged dots" for convenience sake) in which ink is dispersedly discharged. For example, FIG. 9 shows order of generation of discharged dots in a case where n=2 for the dither mask, namely, a 10×10 mask size is used. In practice, a larger mask size is used for texture control.

FIG. 7-(a) to FIG. 7-(i) show tones when the base pattern is most emphasized among all tones that can be expressed. In these halftones, tones are expressed by gradually increasing the discharged dots on the base line. For example, in FIG. 7-(a), the base pattern is emphasized by preferentially arranging discharged dots of small droplets at positions with an angle of 45 degrees in the minimum 5×5 unit. In FIG. 7-(b), the base pattern is emphasized by preferentially arranging discharged dots of medium droplets at positions with the angle of 45 degrees in the minimum 5×5 unit. In FIG. 7-(c), while the base line already formed using the discharged dots of medium droplets is fixed, the base pattern is thickened by preferentially arranging the discharged dots of small droplets on both sides of the base line. Higher tones are expressed in the same manner. In the following, the arrangement of discharged dots for emphasizing the base as shown in FIG. 7-(a) to FIG. 7-(i) is referred to a "base pattern".

Figure 11:
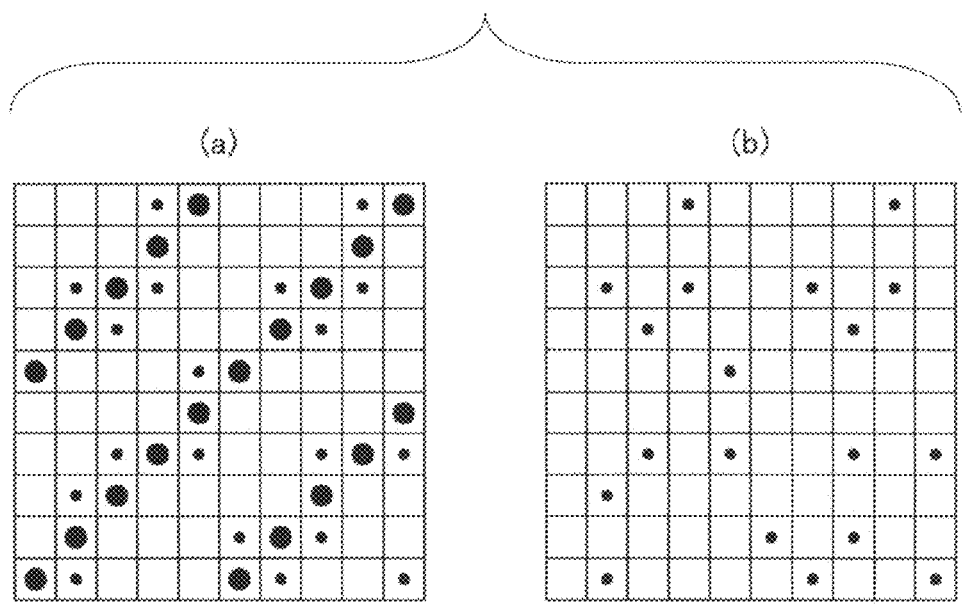
FIG. 11 is a diagram showing a conventional dot arrangement between patterns of halftones in which diagonal line bases are emphasized.

When the tones are expressed, it is necessary to determine order of arrangement of the discharged dots so as to complement the base patterns. The arrangement of the discharged dots in this case has high-pass filter characteristics in which characteristics of human sight (VTF) shown in FIG. 10 are considered. FIG. 11-(a) shows an example of a dot pattern when shifting from the base pattern of FIG. 7-(b) to the base pattern of FIG. 7-(c). FIG. 11-(b) shows a dot pattern in which the base line is removed from FIG. 11-(a). This shows the high-pass filter characteristics.

Figure 12:
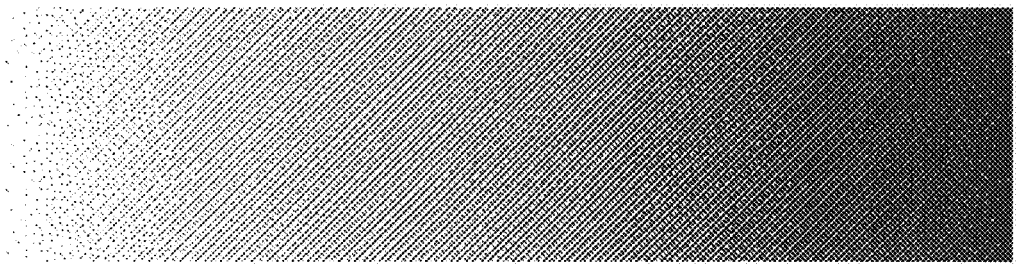
FIG. 12 is a diagram showing a gradation pattern of line base dithering using a conventional halftone process.

FIG. 12 is a diagram showing an example of gradation when an image is recorded using the dither mask generated as mentioned above. This dot pattern is advantageous in that the continuity of tone is maintained in all tones and that banding and the like are unlikely to be noticeable.

Figure 13:
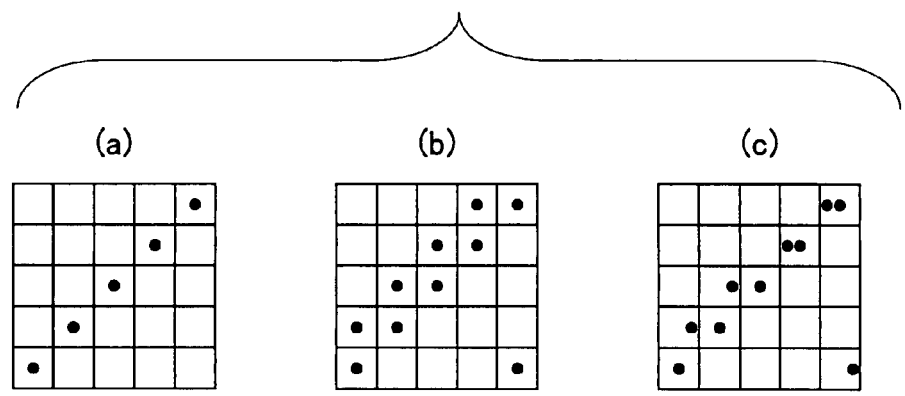
FIG. 13 is a diagram showing overlapping of ink.

However, when landing accuracy of an ink-jet recording apparatus is low, ink droplets may be discharged onto positions shifted from object positions. In this case, granularity (roughness) of the image may be deteriorated or the base line may not formed, so that image quality could be degraded. For example, after the base line is formed as shown in FIG. 13-(a), when ink droplets are discharged onto both sides of the base line so as to thicken the base line, the ink droplets may be discharged at positions shifted from the object positions (refer to FIG. 13-(b)). As a result, ink may be partially overlapped or mixed as shown in FIG. 13-(c), for example.

[Process on PC]

Figure 14:
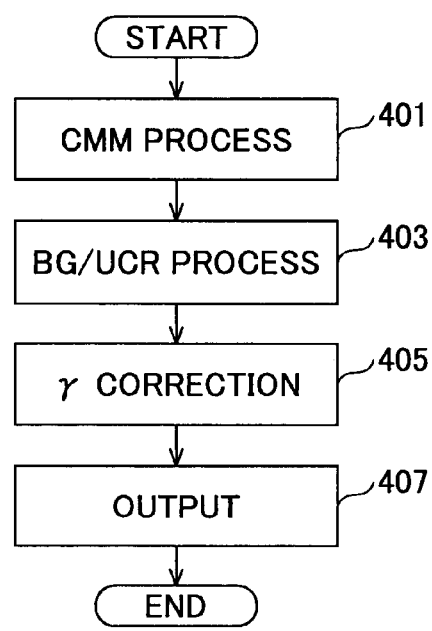
FIG. 14 is a flowchart showing a process in a host PC in response to an image recording request from a user.

Next, the following describes a process when a user requests recording of an image on a PC as an example of the host (hereafter also referred to as a "host PC") with reference to FIG. 14.

In a first step 401, a CMM (Color Management Module) process is performed on image data specified by the user. In the CMM process, the image data is converted from a color space for monitor display (RGB color system) to a color space for image recording apparatuses (CMY color system).

In the next step 403, a BG/UCR (black generation/Under Color Removal) process is performed on the image data subjected to the CMM process. In the BG/UCR process, black generation/under color removal is performed on CMY values.

In the nest step 405, γ correction is preformed on the image data subjected to the CMM process. The γ correction is performed in accordance with characteristics of the ink-jet recording apparatus 1 and an instruction by the user.

In the next step 407, the image data subjected to the γ correction is output to the ink-jet recording apparatus 1 as print data.

[Process in Ink-Jet Recording Apparatus]

Figure 15:
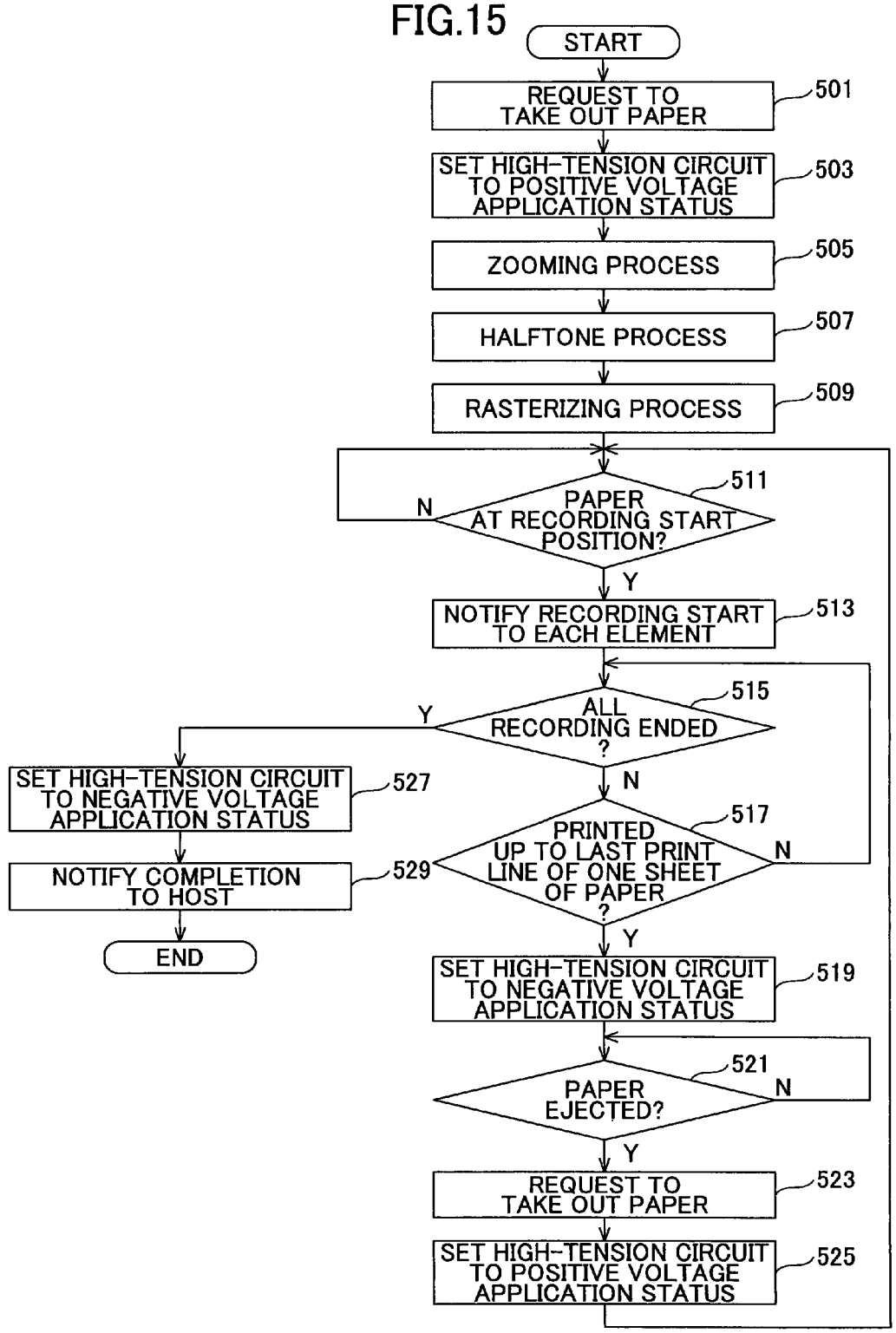
FIG. 15 is a flowchart showing a process (recording process) in the ink-jet recording apparatus in FIG. 1 upon receiving print data from a host PC.
Figure 16:
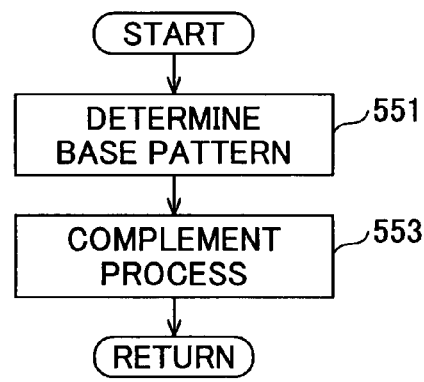
FIG. 16 is a flowchart showing a halftone process in FIG. 15.

Next, the following describes a process performed in the ink-jet recording apparatus 1 when the print data is received from the host PC with reference to FIGS. 15 and 16.

In the ink-jet recording apparatus 1, when the print data is received from the host PC, a starting address of a program corresponding to a flowchart of FIG. 15 stored in the ROM 102 is set in a program counter of the CPU 101 and a process (recording process) is started. In addition, flowcharts of FIGS. 15 and 16 correspond to a series of processing algorithm performed by the CPU 101. The print data from the host PC is stored in the RAM 103.

In a first step 501, a request for taking out paper is output to the up-down mechanism (not shown in the drawings) and the sub-scanning motor driving unit 115. In accordance with this, the paper 3 is taken out from the paper feed tray 4 and is sent to the conveying mechanism 5.

In the next step 503, the high-tension circuit 125 is set to the positive voltage application status. In accordance with this, the conveying belt 33 is positively charged so as to attract the paper 3 to the conveying belt 33.

In the next step 505, a zooming process is performed on the print data stored in the RAM 103. In this case, zooming is performed in accordance with resolution of the ink-jet recording apparatus 1.

In the next step 507, a halftone process is performed and the print data is converted to dot pattern data for each ink to be discharged from the recording head 14. In the halftone process, processing (step 551, step 553) shown in the flowchart of FIG. 16 is performed.

Figure 17:
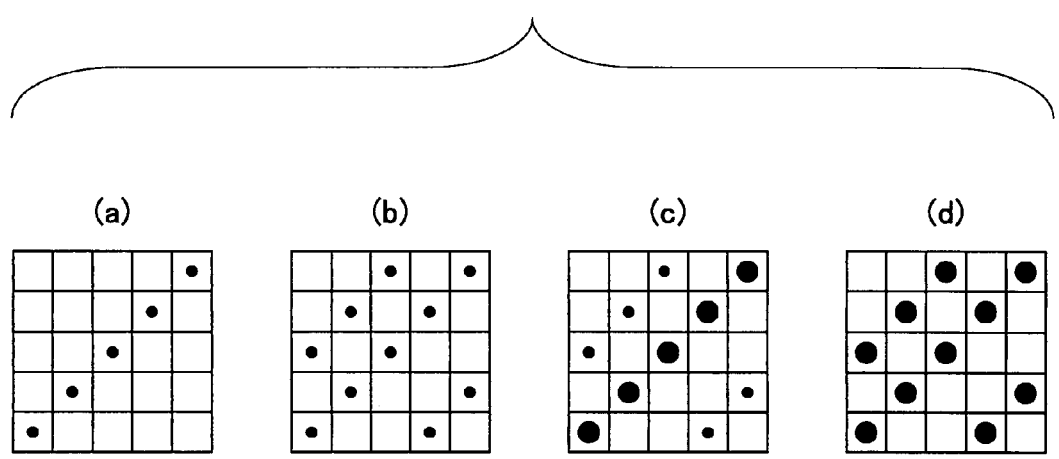
FIG. 17 is a schematic diagram showing a growth pattern of a diagonal line base set in the halftone process in FIG. 7.
Figure 18:
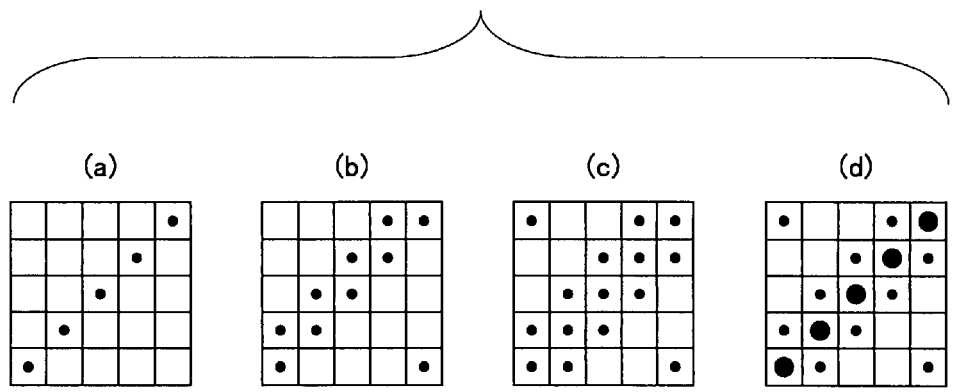
FIG. 18 is a schematic diagram showing a growth pattern of a diagonal line base set in a conventional halftone process.

In step 551, the base pattern is determined. In this case, a dither process method in which the tone continuity is maintained in all tones based on the diagonal line base is used so as to express halftones, for example. In the present embodiment differing from the above-mentioned conventional dither process, when the base line shown in FIG. 17-(a) is thickened, the base pattern is determined such that at least one dot to which ink is not discharged (hereafter also referred to as a "undischarged dot" for convenience sake) is present between the discharged dots as shown in FIG. 17-(b) to FIG. 17-(d). In this case, when it is impossible to have at least one undischarged dot between the discharged dots using only the small droplets, the medium droplets are used as shown in FIG. 17-(c), so that at least one undischarged dot is present between the discharged dots. In addition, in a conventional dither method, when the base pattern shown in FIG. 18-(a) is thickened, ink droplets are placed on adjacent dots as shown in FIG. 18-(b) to FIG. 18-(d). In this case, the halftone process for determining whether to place an ink droplet on each dot includes a dither method and an error diffusion method as will be described later.

In the dither mask created as mentioned above, a space between adjacent ink droplets is increased in comparison with the conventional dither mask and ink is not overlapped or mixed. Thus, when the landing accuracy of the ink-jet recording apparatus 1 is low, it is possible to make failure resulting from shift of landing less noticeable.

In the next step 553, a complement process is performed on the determined base patterns. Density in the determined base patterns is measured and complemented such that characteristics of the density of tones between the patterns form a linear shape. Then, the halftone process is ended and the process proceeds to step 509.

In step 509, a rasterization process is performed. In the rasterization process, dot pattern data is divided into sets of data on a single row and the data is extracted in accordance with each nozzle position for recording. The extracted dot pattern data is stored in the RAM 103.

In the next step 511, whether the paper 3 on the conveying belt 33 is positioned at a recording start position is judged based on the paper position information. When the paper 3 on the conveying belt 33 is not positioned at the recording start position, the judgment is denied and another judgment is made after a predetermined period of time has elapsed. By contrast, when the paper 3 on the conveying belt 33 is positioned at the recording start position, the judgment is affirmed and the process proceeds to step 513. In addition, when the paper 3 on the conveying belt 33 reaches the recording start position, the sub-scanning motor 123 is stopped by the sub-scanning motor driving unit 115. In step 513, a recording start is notified to each element of the control device 100. In accordance with this, ink is discharged from the recording head 14 via the head control unit 111 and the head driver 117.

In the next step 515, whether recording of all the print data requested from the host is ended is judged. When unrecorded print data remains stored in the RAM 103, the judgment is denied and the process proceeds to step 517. In step 517, whether printing is performed up to a last print line of one sheet of the paper 3 determined in advance by the user is judged referring to the paper position information. When the printing is not performed up to the last print line of one sheet of the paper 3, the judgment is denied and the process returns to step 515. The printing on the paper 3 continues while the head control unit 111, the main scanning motor driving unit 113, and the sub-scanning motor driving unit 115 operate in cooperation with one another until the judgment in step 515 or step 517 is affirmed.

In other words, printing for a single row is performed on the stationary paper 3 while the head control unit 111 is moved in the main scanning direction and when the printing for a single row is ended, the paper 3 is moved as much as a single row in the sub-scanning direction (+Y direction in this case) and printing for the next row is performed.

When the judgment in step 517 is affirmed before the judgment in step 515 is affirmed, the process proceeds to step 519. In step 519, the high-tension circuit 125 is set to the negative voltage application status. In accordance with this, the conveying belt 33 is negatively charged and the electrostatic attraction of the paper 3 is released.

In the next step 521, whether the paper 3 is ejected from the conveying belt 33 is judged referring to the paper position information. When the paper 3 is not discharged from the conveying belt 33, the process awaits until the paper 3 is ejected. When the paper 3 is ejected from the conveying belt 33, the judgment is affirmed and the process proceeds to step 523. In step 523, a request for taking out paper is output to the above-mentioned up-down mechanism (not shown in the drawings) and the sub-scanning motor driving unit 115. In accordance with this, a new paper 3 is taken out from the paper feed tray 4 and sent to the conveying mechanism 5.

In the next step 525, the high-tension circuit 125 is set to the positive voltage application status. In accordance with this, the conveying belt 33 is positively charged. And the process returns to the above-mentioned step 511.

In the above-mentioned step 515, when the recording of all the print data requested from the host is ended, the judgment in step 515 is affirmed and the process proceeds to step 527. In step 527, the high-tension circuit 125 is set to the negative voltage application status. In accordance with this, the conveying belt 33 is negatively charged and the electrostatic attraction of the paper 3 is released.

In the next step 529, completion of the recording of print data is notified to the host. And the recording process is ended.

Figure 19:
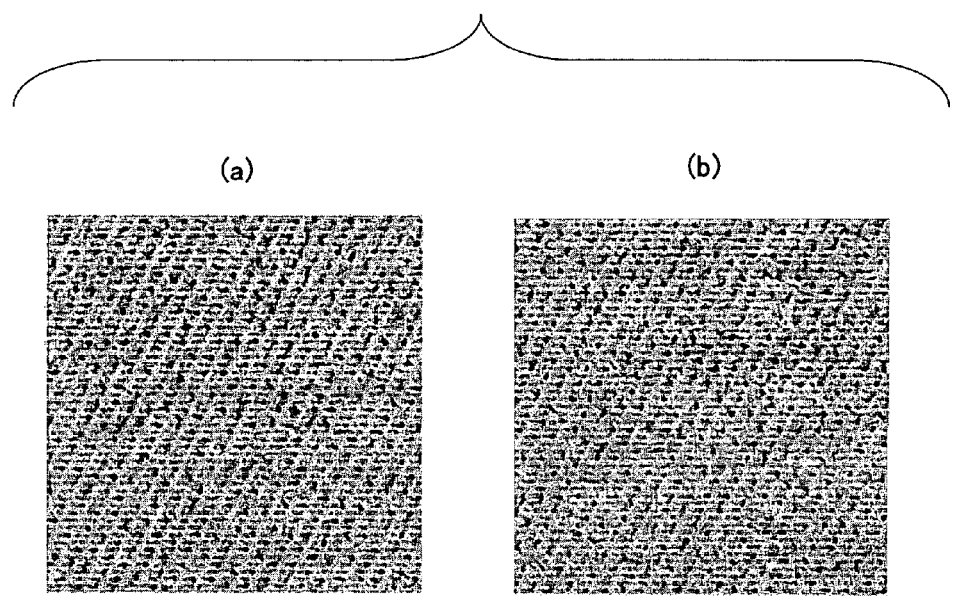
FIG. 19 is a diagram showing images recorded in the recording process in FIG. 15.
Figures 20, 21:
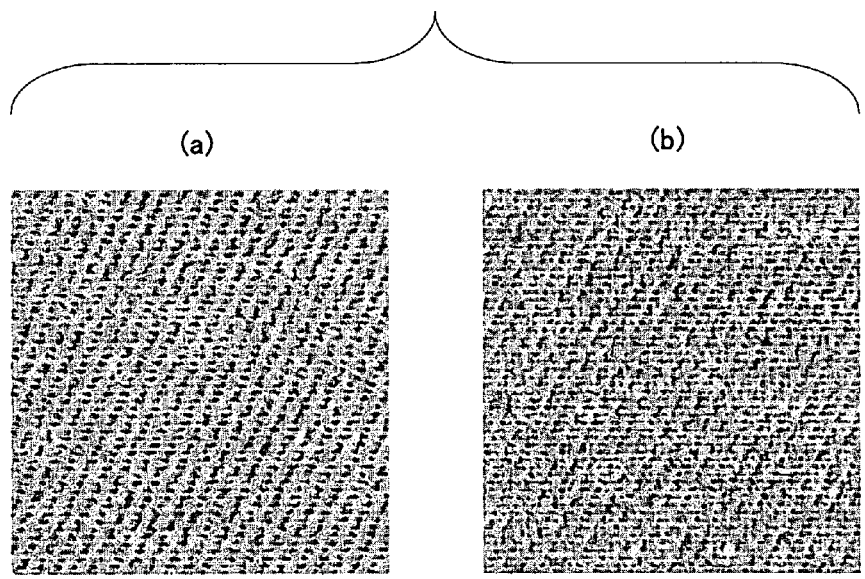
FIG. 20 is a diagram showing images recorded in a conventional recording process.
FIG. 21 is a diagram showing a difference between an image recorded in the recording process of FIG. 15 and an image recorded in a conventional process.

FIG. 19 is a diagram showing images resulting from bidirectional printing of a halftone portion with a single path, no interlace, and the use of only black ink. FIG. 19-(a) shows a result of a going route and FIG. 19-(b) shows a result of a returning route. FIG. 20-(a) shows a result of bidirectional printing of the going route according to the conventional halftone process. FIG. 20-(b) shows a result of bidirectional printing of the returning route according to the conventional halftone process. FIG. 20-(a) shows mixed adjacent droplets. By contrast, FIG. 19-(a) shows an improved result. Thus, in the present embodiment, a difference between the going route and the returning route is reduced in comparison with the conventional halftone process.

As shown in FIG. 21-(a) and FIG. 21-(b), for example, when lightness of the result of each image is measured, in the conventional halftone process, a difference of lightness between the going route and returning route is 1.8. In the present embodiment, the difference of lightness between the going route and returning route is 0.62. In the same manner, when density of the going route and returning route is measured, in the conventional halftone process, a difference of density between the going route and returning route is 0.026. In the present embodiment, the difference of density between the going route and returning route is 0.009. Thus, the present embodiment is capable of performing preferable recording even when the landing accuracy is low. In addition, it is possible to perform preferable recording in a multiple-path recording method and an interlace recording method by performing the halftone process according to the present embodiment.

In the following, the dither method is described as a halftone process method for determining whether to discharge an ink droplet onto each dot.

The dither method is for obtaining N values (N≧2) by comparing an original image with thresholds arranged in a rectangular (matrix) area and the dither method is capable of generating an N-valued image relatively speedy. In the dither method, M×M pixels are used as a unit for expressing tones and a matrix of M×M thresholds is created for the unit. In the following, the threshold matrix is referred to as a "dither mask". The dither mask is superposed on the original image and the density of each pixel is compared with that of a corresponding threshold. When the density is larger than the threshold, an ink dot is attached to the pixel. When the density is smaller than the threshold, an ink droplet (dot) is not attached to the pixel (pixel is left blank). By repeatedly using the mask with the M×M size for all pixels of an entire image, the entire image is obtained as a collection of N values.

Figures 22, 23:
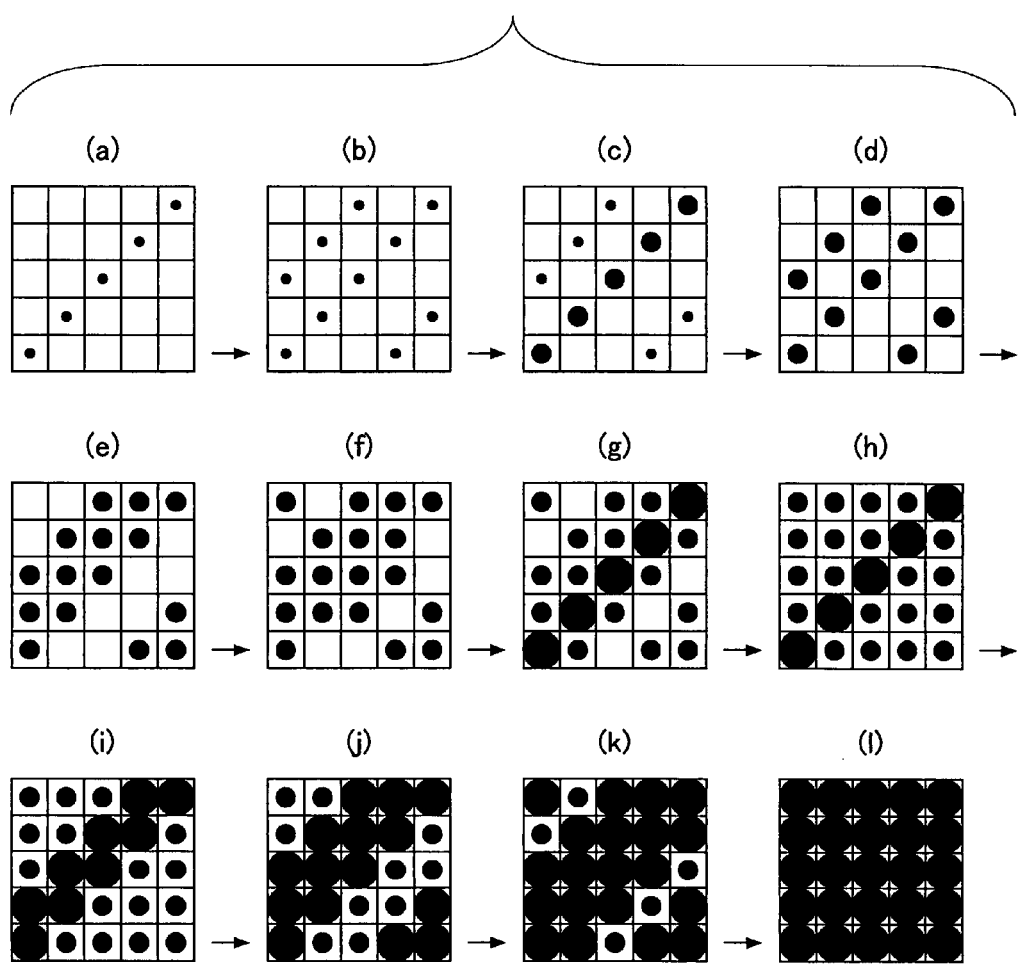
FIG. 22 is a diagram showing size of dots (ink droplets) in a case of multiple values (N=four values)
FIG. 23 is a diagram showing growth of dots to become large droplets in each dot area in a case where a solid image is generated in N=four values in line dithering (⅕ base)

FIG. 22 is a diagram showing size of dots (ink droplets) in a case where N=four values. When N=four values, four types of dots are set including no dot where no dot (ink droplet) is placed, a small dot using a small droplet, a medium dot using a medium droplet, and a large dot using a large droplet as shown in FIG. 22.

When a solid image is generated in the above-mentioned N=four values in line base dithering (⅕ base), namely, when large droplets are placed on all dot areas, dots in each dot area are grown as shown in FIGS. 23-(a) to 23-(l), for example. Positions of dots to be formed are determined so as to be remote from previously formed dots as much as possible.

Figure 24:
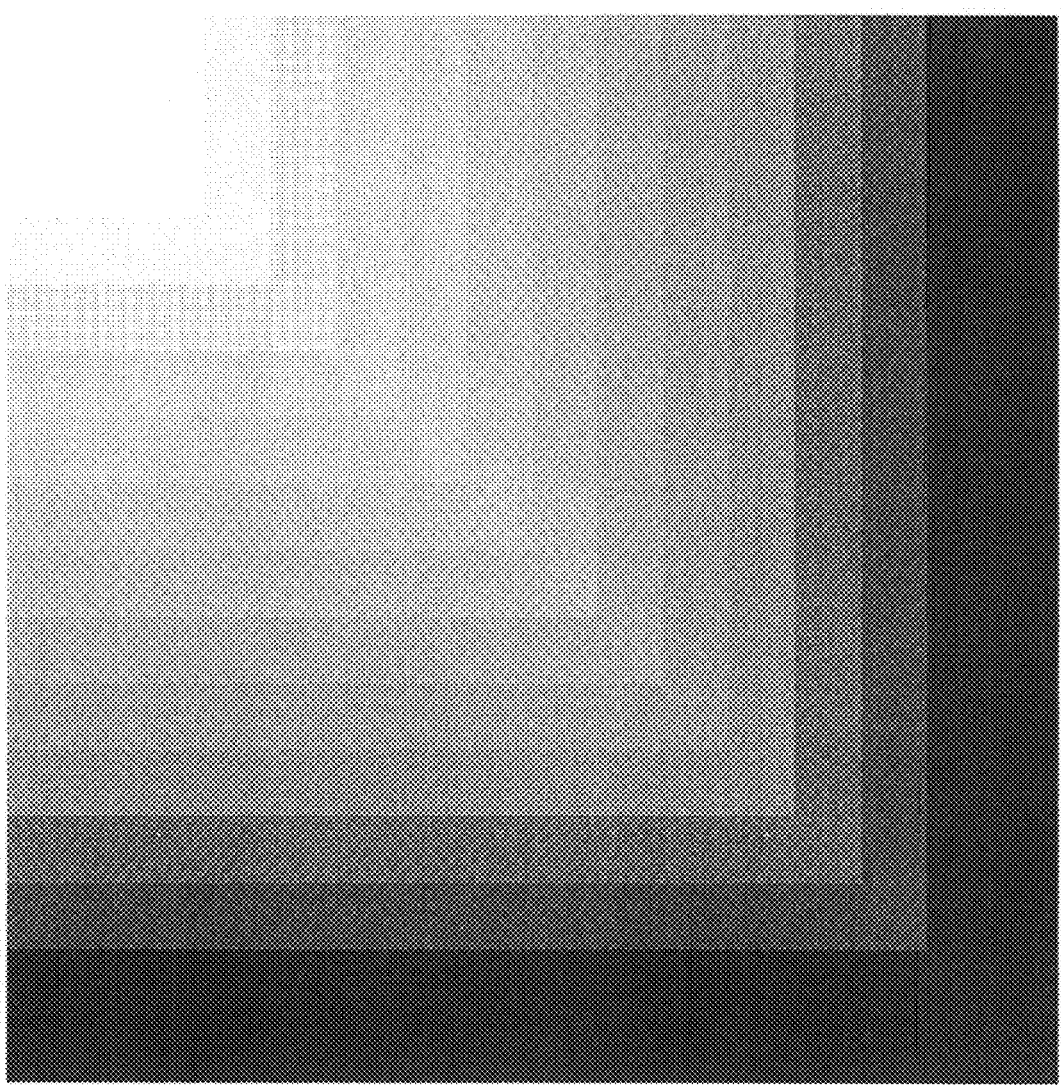
FIG. 24 is a diagram showing values of density of an original image.
Figure 27:
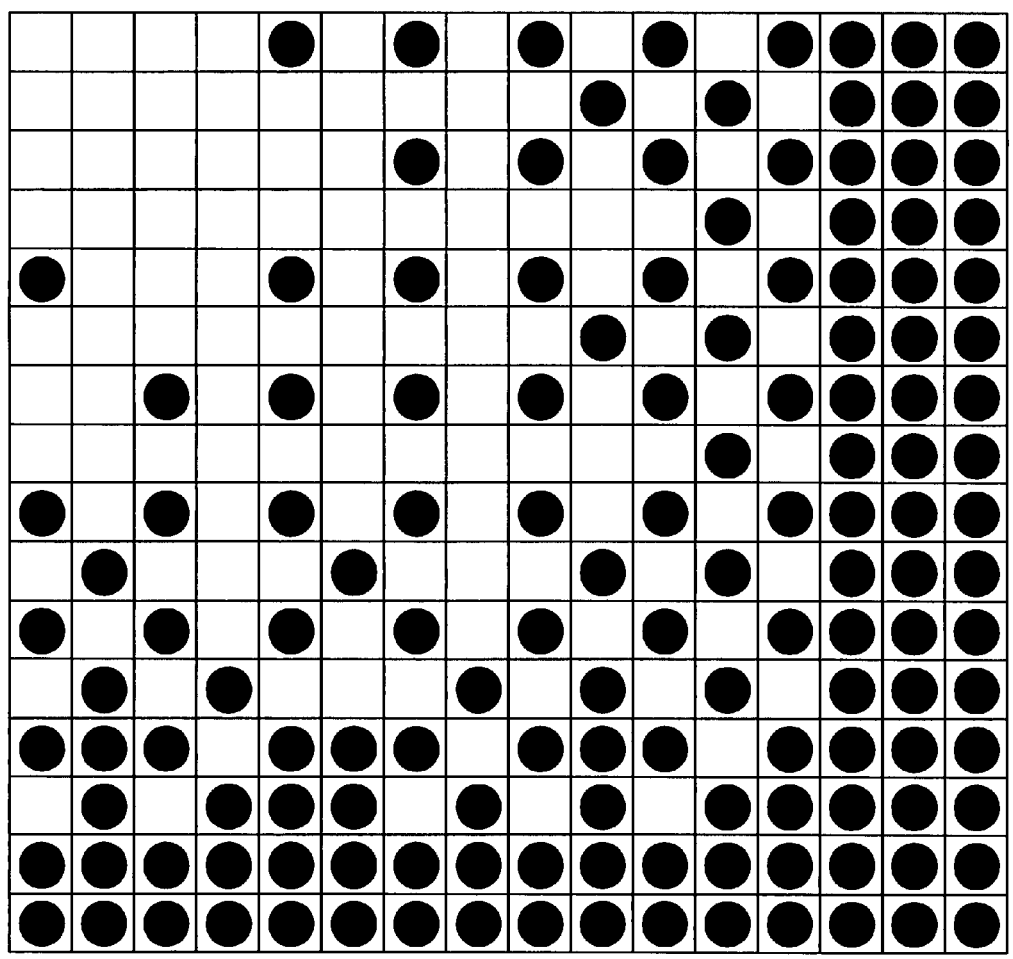
FIG. 27 is a diagram showing an output image through the dither mask of FIG. 26.

The following describes the dither matrix regarding an original image shown in FIG. 24. FIG. 25 is a diagram showing numerical values in a matrix indicating the density of the original image shown in FIG. 24. FIG. 26 is a diagram showing an example of a dither mask in a case of two values. And, FIG. 27 is a diagram showing an output image through the dither mask of FIG. 26.

Figure 31:
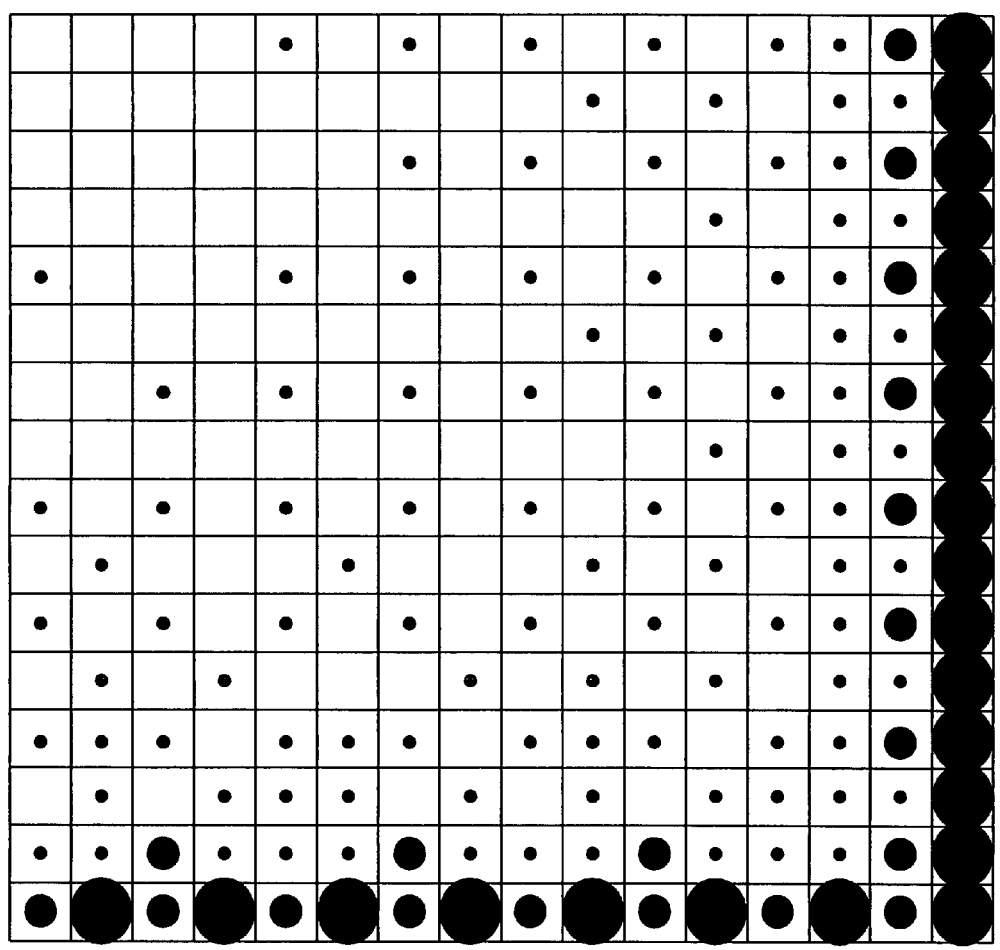
FIG. 31 is a diagram showing an output image through the dither masks of FIGS. 28 to 30.

FIGS. 28 to 30 are diagrams showing examples of dither masks in the case of four values. FIG. 28 shows a dither mask for small droplets. FIG. 29 shows a dither mask for medium droplets. FIG. 30 shows a dither mask for large droplets. And, FIG. 31 is a diagram showing an output image through the dither masks of FIGS. 28 to 30

In the following dither mask, a value of "999" is used as dummy data so as to forcibly control generation of dots. The value of dummy data is not limited to "999" and other value may be used as long as such a value exceeds "255" indicating a maximum value of density.

When N=two values, the original image and the dither mask are compared and ink is attached to pixels exceeding the thresholds of dither mask. For example, a numeral value of "10" is designated to a third dot from left and a first dot from top in FIG. 25 indicating the density of the original image and a numeral value of "30" is designated to the same position in FIG. 26. This dot position is referred to as (3, 1) in coordinates. In this case, the value "10" indicating the density in the original image is less than a threshold "30" in the dither mask, so that no ink droplet is attached. By contrast, at (5, 1) in coordinates, a value indicating the density of the original image is "30" and this is larger than a threshold "8" in the dither mask, so that an ink droplet is attached. By processing the entire image in this manner, positions to which ink is attached are determined.

When N>two values (N=four values, for example), the original image and the dither mask for large droplets shown in FIG. 30 are compared in the same manner. When numeral values in the original image are larger than numeral values in the dither mask, large droplets are attached. In this case, when the numeral values in the original image are smaller than numeral values in the dither mask, the original image and the dither mask for medium droplets shown in FIG. 29 are compared. And, when the numeral values in the original image are larger than the numeral values in the dither mask, medium droplets are attached. In this case, when the numeral values in the original image are smaller than the numeral values in the dither mask, the original image and the dither mask for small droplets shown in FIG. 28 are compared in the same manner. When the numeral values in the original image are larger than the numeral values in the dither mask, small droplets are attached. In this case, when the numeral values in the original image are smaller than the numeral values in the dither mask for small droplets, no dots are attached.

For example, at (15, 1) in coordinates, a numeral value in the original image shown in FIG. 25 is "200" and a numeral value in the dither mask for large droplets shown in FIG. 30 is "244", so that a large droplet is not attached and the numeral value "200" is compared with the dither mask for medium droplets shown in FIG. 29. A corresponding numeral value in the dither mask for medium droplets is "197" and the numeral value "200" in the original image exceeds the numeral value in the dither mask, so that a medium droplet is attached. When ink droplets are attached through determination in this manner, an output image shown in FIG. 31 is obtained.

Figure 33:
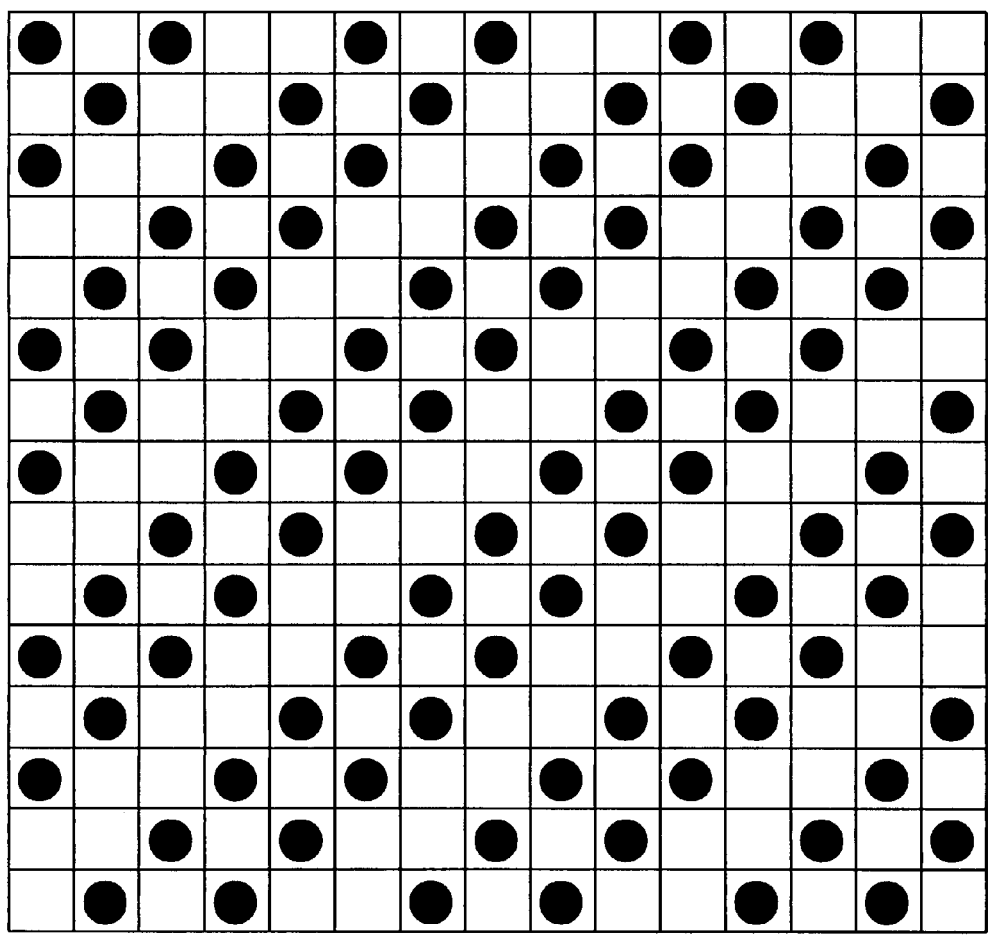
FIG. 33 is a diagram showing an output image through the dither mask shown in FIG. 32.

FIG. 32 is a diagram showing an example of a dither mask obtained by employing the present invention. FIG. 33 is a diagram showing an output image through the dither mask shown in FIG. 32. In the present invention, dots are not generated at adjacent dot positions by using the dummy data "999" as shown in FIG. 32. In other words, the density of dots of the image does not exceed a threshold of "999" and ink droplets are not placed at these positions, so that no ink droplet is placed in adjacent dot areas.

In addition, dither process methods include what is called bayer dithering. In the bayer dithering, the base mask is expressed as:

$$D_2 = \begin{vmatrix} 0 & 2 \\ 3 & 1 \end{vmatrix}$$

and an entire mask is determined on the basis of:

$$D_{2n} = \begin{vmatrix} 4D_{2(n-1)} & 4D_{2(n-1)} + 2U_{2(n-1)} \\ 4D_{2(n-1)} + 3U_{2(n-1)} & 4D_{2(n-1)} + + U_{2(n-1)} \end{vmatrix}$$

where $U_2$ is a $2^n \times 2^n$ matrix in which all of each element is "1".

For example, when n=2, a dither mask $D_4$ is expressed as:

$$D_4 = \begin{vmatrix} 4\begin{vmatrix}0&2\\3&1\end{vmatrix} & 4\begin{vmatrix}0&2\\3&1\end{vmatrix}+2\begin{vmatrix}1&1\\1&1\end{vmatrix} \\ 4\begin{vmatrix}0&2\\3&1\end{vmatrix}+3\begin{vmatrix}1&1\\1&1\end{vmatrix} & 4\begin{vmatrix}0&2\\3&1\end{vmatrix}+\begin{vmatrix}1&1\\1&1\end{vmatrix} \end{vmatrix}$$

$$= \begin{vmatrix} \begin{vmatrix}0&8\\12&4\end{vmatrix} & \begin{vmatrix}0&8\\12&4\end{vmatrix}+\begin{vmatrix}2&2\\2&2\end{vmatrix} \\ \begin{vmatrix}0&8\\12&4\end{vmatrix}+\begin{vmatrix}3&3\\3&3\end{vmatrix} & \begin{vmatrix}0&8\\12&4\end{vmatrix}+\begin{vmatrix}1&1\\1&1\end{vmatrix} \end{vmatrix}$$

$$= \begin{vmatrix} \begin{vmatrix}0&8\\12&4\end{vmatrix} & \begin{vmatrix}2&10\\14&6\end{vmatrix} \\ \begin{vmatrix}3&11\\15&7\end{vmatrix} & \begin{vmatrix}1&9\\13&5\end{vmatrix} \end{vmatrix}$$

$$= \begin{vmatrix} 0 & 8 & 2 & 10 \\ 12 & 4 & 14 & 6 \\ 3 & 11 & 1 & 9 \\ 15 & 7 & 13 & 5 \end{vmatrix}$$

Figures 34, 35:
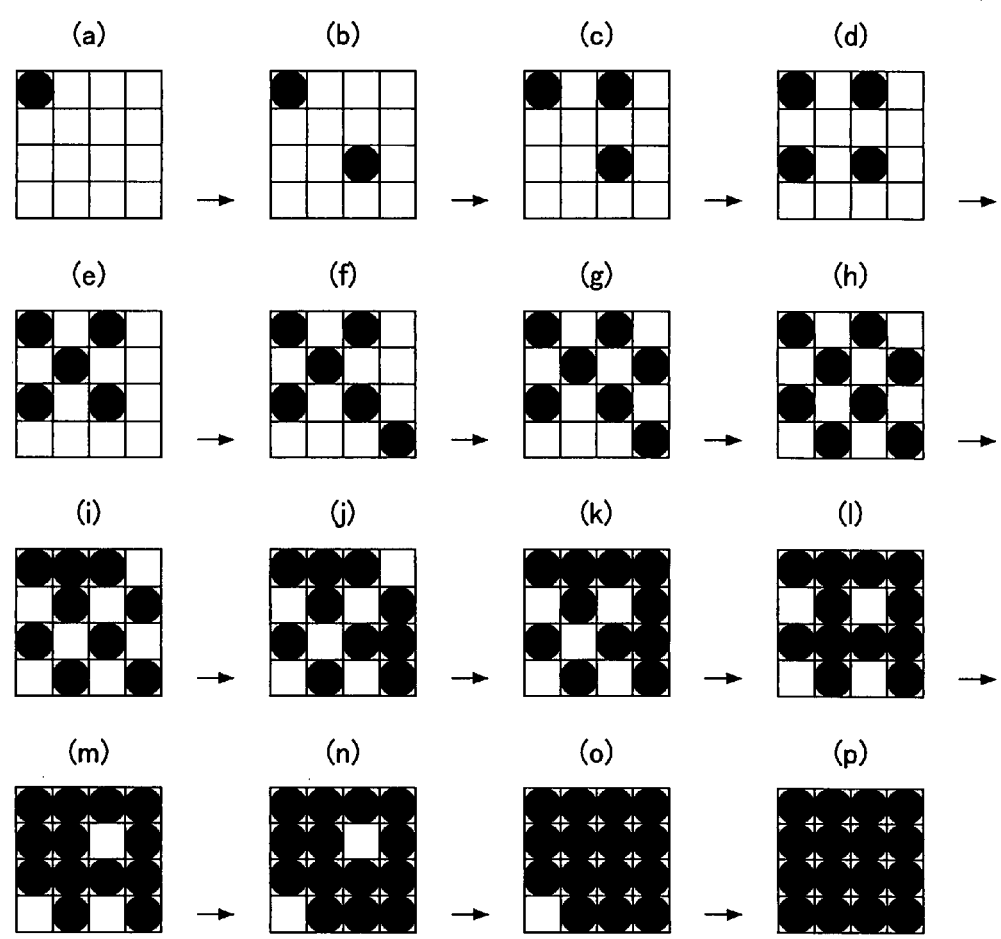
FIG. 34 is a diagram showing a bayer dither mask.
FIG. 35 is a diagram showing how dots are placed through comparison with thresholds in FIG. 34.
Figure 36:
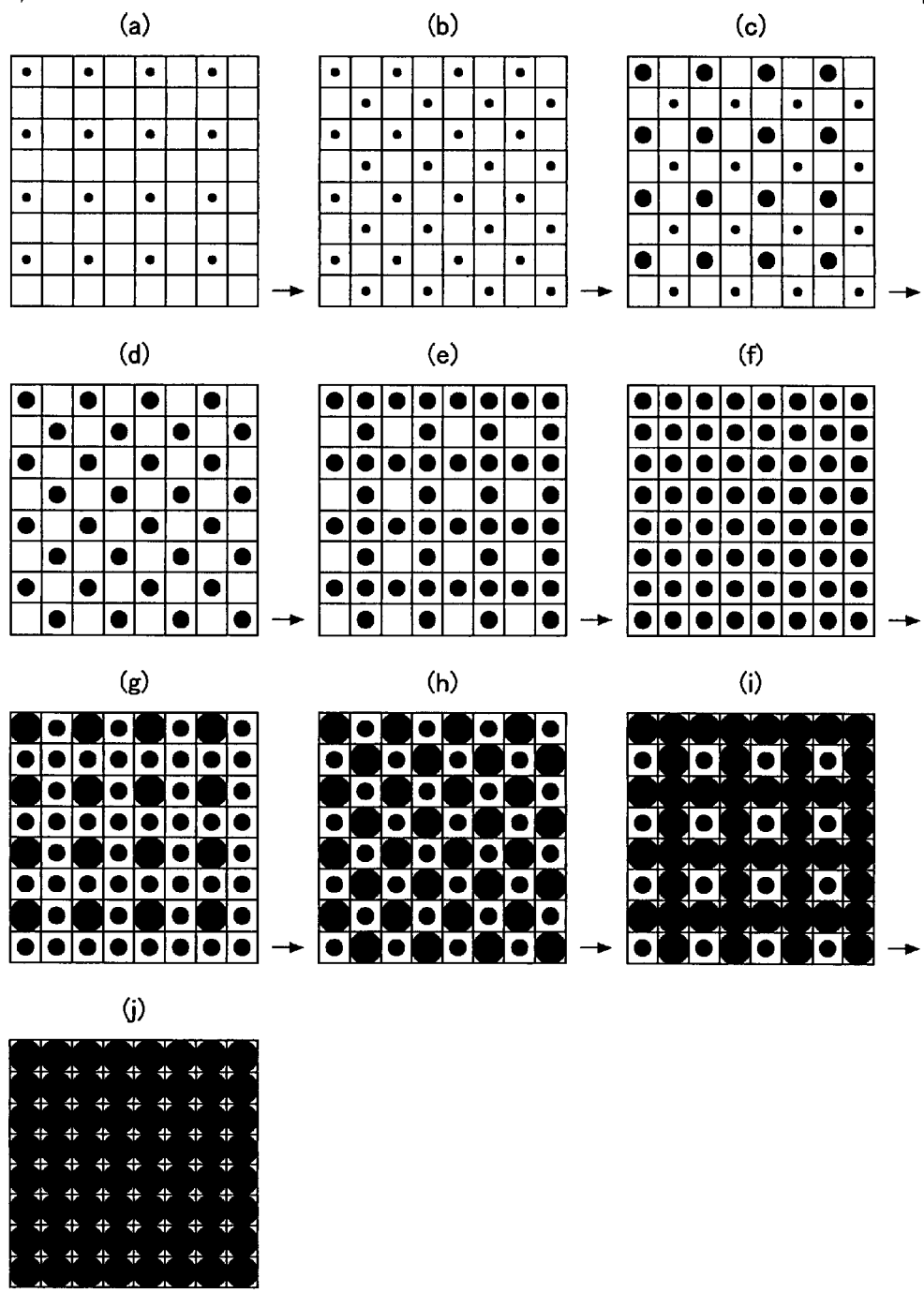
FIG. 36 is a diagram showing an example of a growth pattern of dots in a case of four values in a bayer dither process.

FIG. 34 is a matrix showing the above-mentioned bayer dither mask $D_4$. FIG. 35-(a) to FIG. 35-(p) show how dots are placed through comparison with the thresholds in FIG. 34. First, at upper left coordinates (1, 1) in the matrix of FIG. 34, a threshold is a minimum value of "0" and a first dot is placed at coordinates (1, 1) as shown in FIG. 35-(a). A second smallest number is "1" at coordinates (3, 3) and a dot is placed at coordinates (3, 3) as shown in FIG. 35-(b). A third smallest number is "2" at coordinates (3, 1) and a dot is placed at coordinates (3, 1) as shown in FIG. 35-(c). In the same manner, as shown in FIG. 35-(d) to FIG. 35-(p), dots are placed in ascending order of thresholds, so that the dots are arranged so as to be remote from one another as much as possible. Thus, it is possible to generate an image superior in resolution. FIG. 36-(a) to FIG. 36-(j) show a growth pattern of dots in a case of multiple values (N=four values) in the above-mentioned bayer dither process.

As mentioned above, in the ink-jet recording apparatus according to the present embodiment, tones are set such that at least one dot to which ink is not discharged is present between dots to which ink is discharged upon performing the halftone process on the print data. In accordance with this, it is possible to prevent adjacent ink droplets on paper from becoming mixed even when the landing accuracy is low. Thus, as a result of this, it is possible to record high-quality images without causing an increase of cost or a reduced recording speed. In other words, it is possible to compensate for a poor landing accuracy.

In general, when printing is performed on substances thicker than normal paper such as envelopes, cardboard, or the like, a space between the recording head 14 and the conveying belt 33 (namely, a space between the recording head 14 and the paper 3) is adjusted to be wider in comparison with printing on normal paper. Accordingly, even when the landing accuracy for printing on normal paper satisfies standards set in advance, landing positions for printing on envelopes, cardboard, or the like may be uneven, so that the landing accuracy could not satisfy the standards. In such a case, the above-mentioned halftone process may be performed when printing objects are envelopes, cardboard, or the like and a conventional halftone process is performed when the printing object is normal paper.

Further, when the landing accuracy does not satisfy the standards due to at least one of temperature and humidity exceeding a threshold in the vicinity of the recording head 14, output of the environment sensor 133 may be monitored, so that the above-mentioned halftone process may be performed when at least one of the temperature and humidity exceeds the threshold.

In the above-mentioned embodiment, the conveying belt 33 has a double-layered structure. However, the present invention is not limited to this and the structure may have a single layer or more than two layers.

Figure 37:
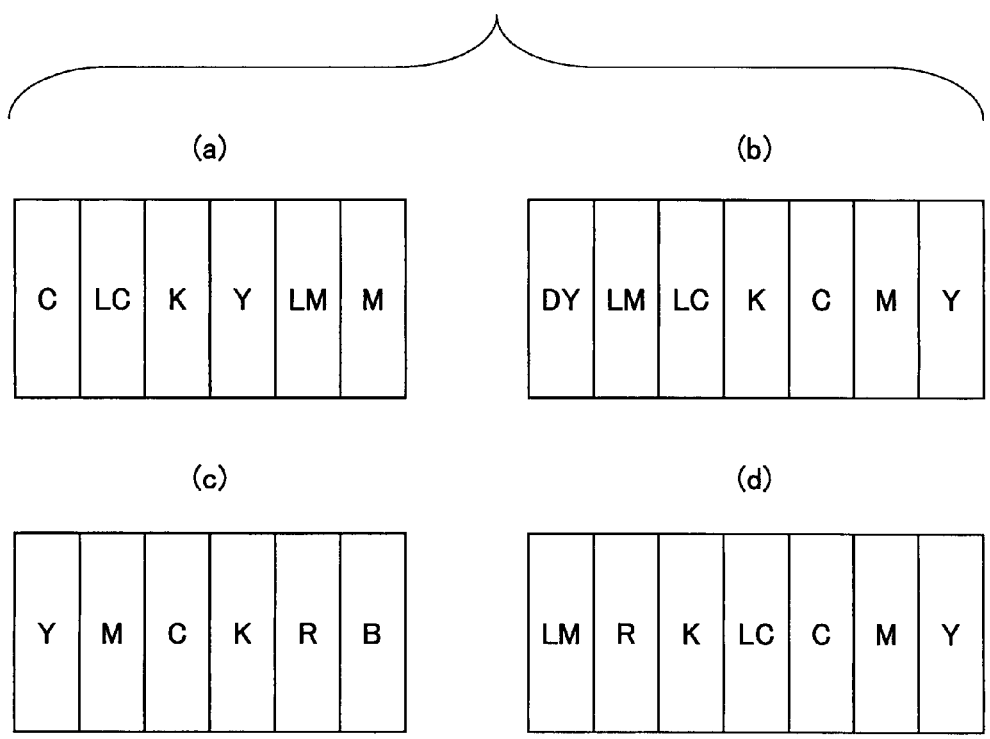
FIG. 37 is a schematic diagram showing variations of a recording head.

In the above-mentioned embodiment, the recording head 14 has ink-jet heads for four colors, namely, black (K), cyan (C), magenta (M), and yellow (Y) However, the present invention is not limited to this. For example, as shown in FIG. 37-(*a*), the recording head 14 may have ink-jet heads for six colors including light cyan (LC) and light magenta (LM) with reduced density in addition to the four colors. Moreover, as shown in FIG. 37-(*b*), for example, the recording head 14 may have ink-jet heads for seven colors including dark yellow (DY) with reduced chroma in addition to the six colors. Further, as shown in FIG. 37-(*c*) and FIG. 37-(*d*), for example, the recording head 14 may have ink-jet heads including a specific color such as red (R), blue (B) or the like.

In the above-mentioned embodiment, although the halftone process is performed on print data of all of the four colors, it is possible to perform the halftone process according to the present embodiment on one to three colors having a great influence on recording quality by selecting from the four colors. In this case, a conventional halftone process may be performed on print data of the other colors having little influence on the recording quality.

In the above-mentioned embodiment, although the programs relating to the present invention are recorded in the ROM 102, the programs may be recorded in other recording media (CD, magneto-optical disk, DVD, memory card, USB memory, flexible disk, and the like). In this case, the programs relating to the present invention are loaded into the above-mentioned NVRAM 104 or a main memory not shown in the drawings via a reproducing device (or a dedicated interface) for each recording medium. In addition, the programs relating to the present invention may be loaded into the NVRAM 104 or the main memory (not shown in the drawings) via a network (LAN, intranet, Internet, or the like).

Further, the above-mentioned zooming process may be performed on the host PC side.

The ink-jet recording apparatuses may experience reduced landing accuracy due to secular change even if the landing accuracy is high upon product shipment. In view of this, prior to recording of print data, presence or absence of abnormality in the landing accuracy may be checked and the above-mentioned halftone process may be performed when abnormality in the landing accuracy is detected.

Figure 38:
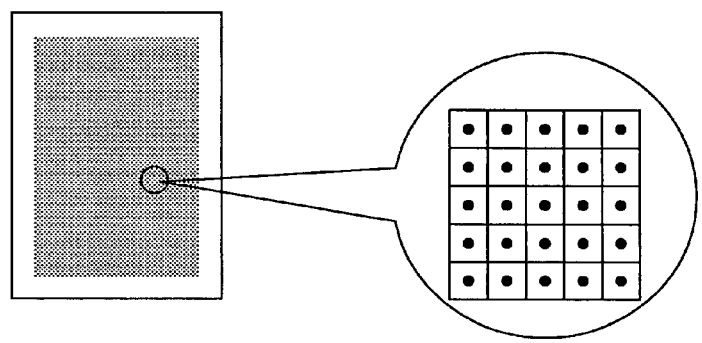
FIG. 38 is a diagram showing a test pattern.

As shown in FIG. 38, for example, after printing is performed on the paper 3 such that ink is discharged onto all dots in a predetermined area, when the density and lightness of the printed portion are measured using a measurement device including a photosensor, it is possible to judge the presence or absence of abnormality in the landing accuracy by comparing the density and lightness of the printed portion with those of a case where an ideal landing is performed. In this case, even when one of the plural nozzles in the recording head 14 has abnormality, the landing accuracy is judged to have abnormality. Then, the CPU 101 may perform the above-mentioned halftone process when "abnormal landing accuracy" is input from the measurement device.

Further, after a predetermined test image is printed on the paper 3, the presence or absence of abnormality in the landing accuracy may be checked by examining whether a color difference is generated between recording in a going route and recording in a returning route through visual observation or a predetermined measurement device by the user. The result may be input form the operation panel 131 and the CPU 101 may perform the halftone process according to the above-mentioned embodiment when "abnormal landing accuracy" is input.

In general, different driving methods are used for different recording modes, so that some recording modes show abnormality in the landing accuracy while other recording modes show no abnormality. In view of this, when the presence or absence of abnormality is examined in all the recording modes in advance, the halftone process according to the above-mentioned embodiment may be performed when print data is recorded in the recording modes showing abnormality in the landing accuracy.

The user may input the presence or absence of abnormality from the operation panel 131 following a comparison of a test image recorded in a conventional halftone process with a sample image having an ideal landing through visual observation or a predetermined measurement device by the user. The CPU 101 may perform the halftone process according to the above-mentioned embodiment when "abnormal landing accuracy" is input.

Depending on preference of the user, one of the halftone process according to the above-mentioned embodiment and a conventional halftone process may be selected. In this case, the user notifies selection to the CPU 101 via the operation panel 131.

In a case of abnormal landing accuracy based on judgment of the CPU 101 or the user, the dithering according to the above-mentioned embodiment may be automatically generated or downloaded via a network or the like.

Figure 39:
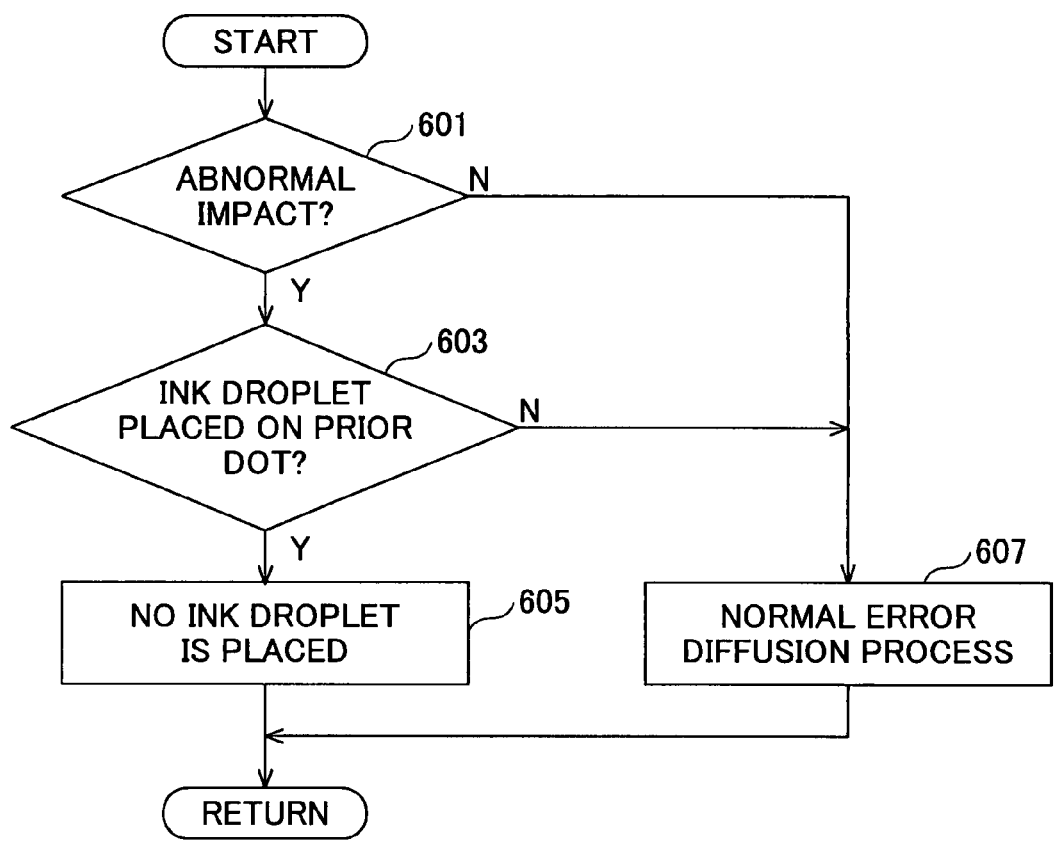
FIG. 39 is a flowchart showing a halftone process in a case where an error diffusion method is used.

In the above-mentioned embodiment, the dither process is used so as to express halftones. However, the present invention is not limited to this. For example, an error diffusion method may be used so as to express halftones. FIG. 39 is a flowchart showing an algorithm in this case.

In the error diffusion method, ink is placed on a certain dot A when a value in which an error obtained from peripheral dots of dot A is added to a tone value of dot A exceeds a predetermined threshold. When the value does not exceed the threshold, ink is not placed. In this case, regarding dot B adjacent to dot A in which whether to place ink is determined prior to dot A, when ink is placed on dot B (Y in step 603), calculation for comparison with the threshold is not performed so as not to place ink on dot A, so that ink is not placed on dot A regardless of the tone value, threshold, and error value (step 605). When ink is not placed on dot B (N in step 603), a normal error diffusion process is performed (step 607). In accordance with this, when the landing accuracy is abnormal, ink is not successively placed on adjacent dots in the same manner as in the above-mentioned embodiment, so that it is possible to obtain the same effect as in the above-mentioned embodiment.

In the above-mentioned embodiment, each ink-jet head of the recording head 14 includes plural discharge nozzle holes. However, the present invention is not limited to this. Each ink-jet head may have a single discharge nozzle.

As mentioned above, the setting method according to the present invention is suitable for preventing adjacent ink droplets from becoming mixed even when the landing accuracy of ink droplets is low. Further, the image recording apparatus according to the present invention is suitable for recording high-quality images without causing an increase of cost or a reduced recording speed. Moreover, the program and recording medium according to the present invention are suitable for causing the image recording apparatus to record high-quality images without causing an increase of cost or a reduced recording speed.

The present invention is not limited to the specifically disclosed embodiment, and variations and modifications may be made without departing from the scope of the present invention.

The present application is based on Japanese priority application No. 2006-070099 filed Mar. 15, 2006, Japanese priority application No. 2007-035524 filed Feb. 15, 2007, the entire contents of which are hereby incorporated herein by reference.

What is claimed is:

1. A method, performed by an image recording apparatus, for setting multiple tones in a halftone process upon recording an image using ink, the method comprising the steps of:
   (a) determining, by the image recording apparatus, for each of the multiple tones, a corresponding base dot pattern for the tone, the base dot pattern including plural dot areas,
   the plural dot areas including at least one non-discharged dot area between each pair of discharged dot areas along a horizontal direction, and including at least one non-discharged dot area between each pair of discharged dot areas along a vertical direction,
   each non-discharged dot area being a dot area for which the ink is not discharged as a dot, and
   each discharged dot area being a dot area for which the ink is discharged as a dot;
   (b) setting the multiple tones to respective base dot patterns, determined in (a), such that for each tone of the multiple tones, at least one non-discharged dot area is present between each pair of discharged dot areas along the horizontal direction and at least one non-discharged dot area is present between each pair of discharged dot areas along the vertical direction, in the base dot pattern set to the tone;
   (c) performing an error diffusion method to express halftones in the halftone process;
   (d) determining whether the ink is discharged as a dot on a preceding dot area, based on a threshold value; and
   (e) determining, in a case that it is determined in (d) that the ink is discharged as a dot on the preceding dot area, regardless of the threshold value, that the ink is not discharged as a dot on a current dot area.

2. The method for setting multiple tones according to claim 1, wherein
   the setting of the multiple tones uses a dither process method to express halftones in the halftone process,
   the multiple tones are set based on an oblique line base such that tone continuity is maintained in all of the multiple tones, and
   a threshold value of a dither mask is set to a value exceeding a maximum value of density of the image.

3. The method for setting multiple tones according to claim 1, wherein
   the multiple tones are set in accordance with ink droplets having at least one size of ink droplet to be attached.

4. The method according to claim 1, wherein for each tone of the multiple tones in the halftone process, the corresponding base dot pattern for the tone includes at least one pair of discharged dot areas along a horizontal direction and at least one pair of discharged dot areas along a vertical direction, and includes at least one non-discharged dot area between each pair of discharged dot areas along a horizontal direction, and including at least one non-discharged dot area between each pair of discharged dot areas along a vertical direction.

5. An image recording apparatus for recording an image using ink, the image recording apparatus comprising:
   a head including at least one nozzle for discharging the ink;
   a setting device for setting multiple tones in a halftone process, said setting device determining, by the image recording apparatus, for each of the multiple tones, a corresponding base dot pattern for the tone, the base dot pattern including plural dot areas, the plural dot areas including at least one non-discharged dot area between each pair of discharged dot areas along a horizontal direction, and including at least one non-discharged dot area between each pair of discharged dot areas along a vertical direction, each non-discharged dot area being a dot area for which the ink is not discharged as a dot, and each discharged dot area being a dot area for which the ink is discharged as a dot, and
   said setting device setting the multiple tones to respective base dot patterns, such that for each tone of the multiple tones, at least one non-discharged dot area is present between each pair of discharged dot areas along the horizontal direction and at least one non-discharged dot area is present between each pair of discharged dot areas along the vertical direction, in the base dot pattern set to the tone; and
   a control device for controlling the head in accordance with the base dot patterns determined in the setting device,
   wherein the setting device performs an error diffusion method to express halftones in the halftone process, and the control device determines whether the ink is discharged as a dot on a preceding dot area, based on a threshold value, and when the control device determines that the ink is discharged as a dot on the preceding dot area, the control device determines, regardless of the threshold value, that the ink is not discharged as a dot on a current dot area.

6. The image recording apparatus according to claim 5, wherein
   the setting device performs a dither process method to express halftones in the halftone process, and
   the multiple tones are set based on an oblique line base such that tone continuity is maintained in all of the multiple tones, and
   a threshold value of a dither mask is set to a value exceeding a maximum value of density of the image.

7. The image recording apparatus according to claim 5, further including:
   a judgment device for judging presence or absence of abnormality in landing accuracy of ink droplets discharged from at least one of the nozzles, wherein
   when the judgment device judges the landing accuracy to be abnormal, the setting device sets the base patterns for the multiple tones such that in each of the base patterns, said at least one dot area to which the ink is not discharged is present between said dot areas to which the ink is discharged.

8. The image recording apparatus according to claim 7, wherein the judgment device judges the presence or absence of abnormality in the landing accuracy based on at least one of density and lightness of a test image recorded by successively discharging the ink onto plural dot areas adjacent to one another in a movement direction of the head.

9. The image recording apparatus according to claim 7, wherein
at least one nozzle includes plural nozzles, and
the judgment device judges the landing accuracy to be abnormal even when one of the plural nozzles has abnormality in the landing accuracy.

10. The image recording apparatus according to claim 7, wherein
the judgment device judges the landing accuracy to be abnormal when the landing accuracy of ink droplets is reduced in at least one of recording in a going route and recording in a returning route.

11. The image recording apparatus according to claim 7, wherein
the image is recorded in one of plural recording modes, and
the judgment device judges the presence or absence of abnormality in each landing accuracy of the plural recording modes.

12. The image recording apparatus according to claim 7, further including:
an input device for inputting the presence or absence of abnormality in the landing accuracy of ink droplets discharged from at least one of the nozzles, wherein
the judgment device judges the landing accuracy to be abnormal when information indicating abnormality in the landing accuracy is input from the input device.

13. The image recording apparatus according to claim 5, wherein
the ink is discharged onto recording paper, and
when a space between the head and the recording paper exceeds a spacing determined in advance, the setting device sets the base patterns for the multiple tones such that in each of the base patterns, said at least one dot area to which the ink is not discharged is present between said dot areas to which the ink is discharged.

14. The image recording apparatus according to claim 5, wherein
the head includes an electrothermal body for applying thermal energy to the ink and generates air bubbles in the ink using the thermal energy so as to discharge the ink from at least one of the nozzles.

15. The image recording apparatus according to claim 5, wherein
the head includes a liquid chamber filled with the ink and a piezoelectric element for deforming the liquid chamber and generates pressure energy by reducing a capacity of the liquid chamber to discharge the ink from at least one of the nozzles.

16. A non-transitory computer-readable recording medium storing a computer-readable program used in an image recording apparatus for recording an image using ink which, when executed by a computer for controlling the image recording apparatus, causes the computer to perform a method for setting multiple tones in a halftone process, said method comprising:

(a) determining, by the image recording apparatus, for each of the multiple tones, a corresponding base dot pattern for the tone, the base dot pattern including plural dot areas,
the plural dot areas including at least one non-discharged dot area between each pair of discharged dot areas along a horizontal direction, and including at least one non-discharged dot area between each pair of discharged dot areas along a vertical direction,
each non-discharged dot area being a dot area for which the ink is not discharged as a dot, and
each discharged dot area being a dot area for which the ink is discharged as a dot; and (b) setting the multiple tones to respective base dot patterns, determined in (a), such that for each tone of the multiple tones, at least one non-discharged dot area is present between each pair of discharged dot areas along the horizontal direction and at least one non-discharged dot area is present between each pair of discharged dot areas along the vertical direction, in the base dot pattern set to the tone;

(c) performing an error diffusion method to express halftones in the halftone process;

(d) determining whether the ink is discharged as a dot on a preceding dot area, based on a threshold value; and (e) determining, in a case that it is determined in (d) that the ink is discharged as a dot on the preceding dot area, regardless of the threshold value, that the ink is not discharged as a dot on a current dot area.

17. The non-transitory computer-readable recording medium of claim 16, wherein
the setting of the multiple tones uses a dither process method to express halftones in the halftone process,
the multiple tones are set based on an oblique line base such that tone continuity is maintained in all of the multiple tones, and
a threshold value of a dither mask is set to a value exceeding a maximum value of density of the image.

* * * * *